(12) United States Patent
Sheets

(10) Patent No.: US 11,017,402 B2
(45) Date of Patent: May 25, 2021

(54) SYSTEM AND METHOD USING AUTHORIZATION AND DIRECT CREDIT MESSAGING

(71) Applicant: Visa International Service Association, San Francisco, CA (US)

(72) Inventor: John F. Sheets, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 692 days.

(21) Appl. No.: 15/477,879

(22) Filed: Apr. 3, 2017

(65) Prior Publication Data

US 2017/0206524 A1    Jul. 20, 2017

Related U.S. Application Data

(62) Division of application No. 14/305,930, filed on Jun. 16, 2014, now Pat. No. 10,878,422.
(Continued)

(51) Int. Cl.
*G06Q 20/40* (2012.01)
*G06Q 20/38* (2012.01)
(Continued)

(52) U.S. Cl.
CPC ......... *G06Q 20/4016* (2013.01); *G06Q 20/20* (2013.01); *G06Q 20/32* (2013.01);
(Continued)

(58) Field of Classification Search
CPC .... G06Q 20/4016; G06Q 20/40; G06Q 20/32; G06Q 20/322; G06Q 20/401; G06Q 20/3226; G06Q 20/3274; G06Q 20/3276
See application file for complete search history.

(56) References Cited

U.S. PATENT DOCUMENTS 5,613,012 A    3/1997    Hoffman
5,781,438 A    7/1998    Lee
(Continued)

FOREIGN PATENT DOCUMENTS

EP    2156397 A1    2/2010
WO    2001035304 A1    5/2001
(Continued)

OTHER PUBLICATIONS

"Using a Mobile Device to Enhance Customer Trust in the Security of Remote Transactions"; Thair Al-Dala'in, Suhuai Luo and Peter Summons; 'NPL—Using a Mobile Device to Enhance Customer Trust.pdf' (Year: 2008).*
(Continued)

*Primary Examiner* — Patrick McAtee
*Assistant Examiner* — Edgar R Martinez-Hernandez
(74) *Attorney, Agent, or Firm* — Kilpatrick Townsend & Stockton LLP

(57) ABSTRACT

A merchant computer generates a token including a "pay-me" merchant account identifier and transaction data for a transaction conducted by a consumer. The merchant token can be obtained by a mobile communication device and transmitted to a payment processing network along with a device identifier for the mobile communication device and an authentication token provided by the consumer. The payment processing network can authenticate the device using the authentication token, retrieve a consumer account number based on the device identifier, and complete the transaction by pushing money into the merchant "pay-me" account from the consumer account.

14 Claims, 9 Drawing Sheets

Related U.S. Application Data

(60) Provisional application No. 61/835,793, filed on Jun. 17, 2013.

(51) Int. Cl.
*G06Q 20/32* (2012.01)
*G06Q 20/36* (2012.01)
*G06Q 20/20* (2012.01)
*H04L 12/14* (2006.01)

(52) U.S. Cl.
CPC ..... *G06Q 20/3226* (2013.01); *G06Q 20/3276* (2013.01); *G06Q 20/3674* (2013.01); *G06Q 20/385* (2013.01); *G06Q 20/40* (2013.01); *G06Q 20/401* (2013.01); *H04L 12/1457* (2013.01); *H04L 2463/102* (2013.01)

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,182,894 B1 | 2/2001 | Hackett et al. |
| 6,192,142 B1 | 2/2001 | Pare, Jr. |
| 6,227,447 B1 | 5/2001 | Campisano |
| 6,236,981 B1 | 5/2001 | Hill |
| 6,267,292 B1 | 7/2001 | Walker |
| 6,327,578 B1 * | 12/2001 | Linehan ................. G06Q 20/02 705/65 |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,636,883 B1 | 10/2003 | Zebrowski, Jr. |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,575 B1 | 9/2006 | Linehan |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,603,382 B2 | 10/2009 | Halt, Jr. |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,664,701 B2 | 2/2010 | Phillips et al. |
| 7,685,037 B2 | 3/2010 | Reiners |
| 7,702,578 B2 | 4/2010 | Fung |
| 7,707,120 B2 * | 4/2010 | Dominguez ........... G06Q 20/02 705/78 |
| 7,712,655 B2 | 5/2010 | Wong |
| 7,729,984 B1 | 6/2010 | Nappi |
| 7,734,527 B2 | 6/2010 | Uzo |
| 7,753,265 B2 | 7/2010 | Harris |
| 7,757,298 B2 | 7/2010 | Shuster |
| 7,770,789 B2 | 8/2010 | Oder, II |
| 7,784,684 B2 | 8/2010 | Labrou et al. |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 * | 9/2010 | Smith ................... G06Q 20/04 235/379 |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,908,645 B2 | 3/2011 | Varghese |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,083,137 B2 | 12/2011 | Tannenbaum |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 * | 2/2012 | Carlson ................. G06Q 20/02 705/67 |
| 8,126,449 B2 | 2/2012 | Beenau |
| 8,131,745 B1 | 3/2012 | Hoffman |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 * | 7/2012 | Patterson ............... G06Q 20/02 705/1.1 |
| 8,219,490 B2 | 7/2012 | Hammad et al. |
| 8,224,702 B2 | 7/2012 | Mengerink |

(56) References Cited

U.S. PATENT DOCUMENTS

| | | | |
|---|---|---|---|
| 8,225,385 B2 | 7/2012 | Chow | |
| 8,229,852 B2 | 7/2012 | Carlson | |
| 8,249,957 B2 | 8/2012 | Mullen | |
| 8,265,993 B2 | 9/2012 | Chien | |
| 8,275,995 B2 | 9/2012 | Jobmann | |
| 8,280,777 B2 | 10/2012 | Mengerink | |
| 8,281,991 B2 | 10/2012 | Wentker et al. | |
| 8,306,846 B2* | 11/2012 | Tavares | G06Q 30/0201 705/7.29 |
| 8,328,095 B2 | 12/2012 | Oder, II | |
| 8,332,323 B2 | 12/2012 | Stals et al. | |
| 8,336,088 B2 | 12/2012 | Raj et al. | |
| 8,346,666 B2 | 1/2013 | Lindelsee et al. | |
| 8,346,672 B1 | 1/2013 | Weiner | |
| 8,376,225 B1 | 2/2013 | Hopkins, III | |
| 8,380,177 B2* | 2/2013 | Laracey | G06Q 30/0253 455/414.1 |
| 8,387,873 B2 | 3/2013 | Saunders | |
| 8,401,539 B2 | 3/2013 | Beenau | |
| 8,401,898 B2 | 3/2013 | Chien | |
| 8,402,555 B2 | 3/2013 | Grecia | |
| 8,403,211 B2 | 3/2013 | Brooks | |
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,452,666 B2 | 5/2013 | Patel | |
| 8,453,223 B2 | 5/2013 | Svigals | |
| 8,453,925 B2 | 6/2013 | Fisher | |
| 8,458,487 B1 | 6/2013 | Palgon | |
| 8,473,415 B2 | 6/2013 | Siegel | |
| 8,484,134 B2 | 7/2013 | Hobson | |
| 8,485,437 B2 | 7/2013 | Mullen | |
| 8,494,959 B2 | 7/2013 | Hathaway | |
| 8,498,908 B2 | 7/2013 | Mengerink | |
| 8,504,475 B2 | 8/2013 | Brand et al. | |
| 8,504,478 B2 | 8/2013 | Saunders | |
| 8,510,816 B2 | 8/2013 | Quach | |
| 8,433,116 B2 | 9/2013 | Davis et al. | |
| 8,533,860 B1 | 9/2013 | Grecia | |
| 8,538,845 B2 | 9/2013 | Liberty | |
| 8,555,079 B2 | 10/2013 | Shablygin | |
| 8,566,168 B1 | 10/2013 | Bierbaum | |
| 8,567,670 B2 | 10/2013 | Stanfield | |
| 8,571,939 B2 | 10/2013 | Lindsey | |
| 8,577,336 B2 | 11/2013 | Mechaley, Jr. | |
| 8,577,803 B2 | 11/2013 | Chatterjee | |
| 8,577,813 B2 | 11/2013 | Weiss | |
| 8,578,176 B2 | 11/2013 | Mattsson | |
| 8,583,494 B2 | 11/2013 | Fisher | |
| 8,584,251 B2 | 11/2013 | Mcguire | |
| 8,589,237 B2 | 11/2013 | Fisher | |
| 8,589,271 B2 | 11/2013 | Evans | |
| 8,589,291 B2 | 11/2013 | Carlson | |
| 8,595,098 B2 | 11/2013 | Starai | |
| 8,595,812 B2 | 11/2013 | Bomar | |
| 8,595,850 B2 | 11/2013 | Spies | |
| 8,606,638 B2 | 12/2013 | Dragt | |
| 8,606,700 B2 | 12/2013 | Carlson | |
| 8,606,720 B1 | 12/2013 | Baker | |
| 8,615,468 B2 | 12/2013 | Varadarajan | |
| 8,620,754 B2 | 12/2013 | Fisher | |
| 8,635,157 B2 | 1/2014 | Smith | |
| 8,646,059 B1 | 2/2014 | Von Behren | |
| 8,651,374 B2 | 2/2014 | Brabson | |
| 8,656,180 B2 | 2/2014 | Shablygin | |
| 8,682,802 B1 | 3/2014 | Kannanari | |
| 8,751,391 B2 | 6/2014 | Freund | |
| 8,751,793 B2 | 6/2014 | Ginter | |
| 8,762,263 B2 | 6/2014 | Gauthier et al. | |
| 8,793,186 B2 | 7/2014 | Patterson | |
| 8,838,982 B2 | 9/2014 | Carlson et al. | |
| 8,856,539 B2 | 10/2014 | Weiss | |
| 8,887,308 B2 | 11/2014 | Grecia | |
| 9,065,643 B2 | 6/2015 | Hurry et al. | |
| 9,070,129 B2 | 6/2015 | Sheets et al. | |
| 9,100,826 B2 | 8/2015 | Weiss | |
| 9,160,741 B2 | 10/2015 | Wentker et al. | |
| 9,229,964 B2 | 1/2016 | Stevelinck | |
| 9,245,267 B2 | 1/2016 | Singh | |
| 9,249,241 B2 | 2/2016 | Dai et al. | |
| 9,256,871 B2 | 2/2016 | Anderson et al. | |
| 9,280,765 B2* | 3/2016 | Hammad | G06Q 20/382 |
| 9,342,832 B2* | 5/2016 | Basu | G06Q 20/02 |
| 9,530,137 B2 | 12/2016 | Weiss | |
| 9,721,283 B2* | 8/2017 | Tanaka | G06Q 30/0613 |
| 2001/0029485 A1 | 10/2001 | Brody | |
| 2001/0034720 A1 | 10/2001 | Armes | |
| 2001/0054003 A1 | 12/2001 | Chien | |
| 2002/0007320 A1 | 1/2002 | Hogan | |
| 2002/0016749 A1 | 2/2002 | Borecki | |
| 2002/0029193 A1 | 3/2002 | Ranjan | |
| 2002/0035548 A1 | 3/2002 | Hogan | |
| 2002/0073045 A1 | 6/2002 | Rubin | |
| 2002/0077978 A1 | 6/2002 | O'Leary | |
| 2002/0116341 A1 | 8/2002 | Hogan | |
| 2002/0133467 A1 | 9/2002 | Hobson | |
| 2002/0147913 A1* | 10/2002 | Lun Yip | G06Q 20/12 713/184 |
| 2003/0028481 A1 | 2/2003 | Flitcroft | |
| 2003/0130955 A1 | 7/2003 | Hawthorne | |
| 2003/0191709 A1 | 10/2003 | Elston | |
| 2003/0191945 A1 | 10/2003 | Keech | |
| 2004/0010462 A1 | 1/2004 | Moon | |
| 2004/0050928 A1* | 3/2004 | Bishop | G06Q 20/04 235/380 |
| 2004/0059682 A1 | 3/2004 | Hasumi | |
| 2004/0093281 A1 | 5/2004 | Silverstein | |
| 2004/0139008 A1 | 7/2004 | Mascavage | |
| 2004/0143532 A1 | 7/2004 | Lee | |
| 2004/0158532 A1 | 8/2004 | Breck | |
| 2004/0210449 A1 | 10/2004 | Breck | |
| 2004/0210498 A1 | 10/2004 | Freund | |
| 2004/0232225 A1 | 11/2004 | Bishop | |
| 2004/0260646 A1 | 12/2004 | Berardi | |
| 2005/0027543 A1 | 2/2005 | Labrou | |
| 2005/0037735 A1 | 2/2005 | Coutts | |
| 2005/0080730 A1 | 4/2005 | Sorrentino | |
| 2005/0108178 A1 | 5/2005 | York | |
| 2005/0199709 A1 | 9/2005 | Linlor | |
| 2005/0246293 A1 | 11/2005 | Ong | |
| 2005/0269401 A1 | 12/2005 | Spitzer | |
| 2005/0269402 A1 | 12/2005 | Spitzer | |
| 2006/0080243 A1 | 4/2006 | Kemper | |
| 2006/0235795 A1 | 10/2006 | Johnson | |
| 2006/0237528 A1 | 10/2006 | Bishop | |
| 2006/0278704 A1 | 12/2006 | Saunders | |
| 2007/0107044 A1 | 5/2007 | Yuen | |
| 2007/0129955 A1 | 6/2007 | Dalmia | |
| 2007/0136193 A1 | 6/2007 | Starr | |
| 2007/0136211 A1* | 6/2007 | Brown | G06Q 20/4018 705/75 |
| 2007/0170247 A1 | 7/2007 | Friedman | |
| 2007/0179885 A1 | 8/2007 | Bird | |
| 2007/0208671 A1 | 9/2007 | Brown | |
| 2007/0245414 A1 | 10/2007 | Chan | |
| 2007/0255662 A1 | 11/2007 | Tumminaro | |
| 2007/0288377 A1 | 12/2007 | Shaked | |
| 2007/0291995 A1 | 12/2007 | Rivera | |
| 2008/0005037 A1* | 1/2008 | Hammad | G06Q 20/3821 705/67 |
| 2008/0015988 A1 | 1/2008 | Brown | |
| 2008/0029607 A1 | 2/2008 | Mullen | |
| 2008/0035738 A1 | 2/2008 | Mullen | |
| 2008/0052226 A1 | 2/2008 | Agarwal | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065554 A1 | 3/2008 | Hogan | |
| 2008/0065555 A1 | 3/2008 | Mullen | |
| 2008/0126251 A1 | 5/2008 | Wassingbo | |
| 2008/0201264 A1 | 8/2008 | Brown | |
| 2008/0201265 A1 | 8/2008 | Hewton | |
| 2008/0228646 A1 | 9/2008 | Myers | |

(56) References Cited

U.S. PATENT DOCUMENTS

| | | | |
|---|---|---|---|
| 2008/0243702 A1 | 10/2008 | Hart | |
| 2008/0245855 A1 | 10/2008 | Fein | |
| 2008/0245861 A1 | 10/2008 | Fein | |
| 2008/0283591 A1 | 11/2008 | Oder, II | |
| 2008/0302869 A1 | 12/2008 | Mullen | |
| 2008/0302876 A1 | 12/2008 | Mullen | |
| 2008/0313264 A1 | 12/2008 | Pestoni | |
| 2009/0006262 A1 | 1/2009 | Brown | |
| 2009/0010488 A1 | 1/2009 | Matsuoka | |
| 2009/0037333 A1 | 2/2009 | Flitcroft | |
| 2009/0037388 A1 | 2/2009 | Cooper | |
| 2009/0043702 A1 | 2/2009 | Bennett | |
| 2009/0048971 A1 | 2/2009 | Hathaway | |
| 2009/0106112 A1 | 4/2009 | Dalmia | |
| 2009/0106160 A1* | 4/2009 | Skowronek | G06Q 20/045 705/75 |
| 2009/0134217 A1 | 5/2009 | Flitcroft | |
| 2009/0157555 A1* | 6/2009 | Biffle | G06Q 20/023 705/67 |
| 2009/0159673 A1 | 6/2009 | Mullen | |
| 2009/0159700 A1 | 6/2009 | Mullen | |
| 2009/0159707 A1 | 6/2009 | Mullen | |
| 2009/0164354 A1* | 6/2009 | Ledbetter | G06Q 20/40 705/30 |
| 2009/0173782 A1 | 7/2009 | Muscato | |
| 2009/0200371 A1 | 8/2009 | Kean | |
| 2009/0234760 A1 | 9/2009 | Walter | |
| 2009/0248583 A1* | 10/2009 | Chhabra | G06Q 20/10 705/76 |
| 2009/0276347 A1 | 11/2009 | Kargman | |
| 2009/0281948 A1 | 11/2009 | Carlson | |
| 2009/0294527 A1 | 12/2009 | Brabson | |
| 2009/0307139 A1 | 12/2009 | Mardikar | |
| 2009/0308921 A1 | 12/2009 | Mullen | |
| 2009/0327131 A1* | 12/2009 | Beenau | G06Q 20/32 705/44 |
| 2010/0008535 A1 | 1/2010 | Abulafia | |
| 2010/0088237 A1 | 4/2010 | Wankmueller | |
| 2010/0094755 A1 | 4/2010 | Kloster | |
| 2010/0106644 A1 | 4/2010 | Annan | |
| 2010/0120408 A1 | 5/2010 | Beenau | |
| 2010/0133334 A1 | 6/2010 | Vadhri | |
| 2010/0138347 A1* | 6/2010 | Chen | G06Q 20/10 705/44 |
| 2010/0145860 A1 | 6/2010 | Pelegero | |
| 2010/0161433 A1* | 6/2010 | White | G06Q 20/20 705/17 |
| 2010/0174556 A1 | 7/2010 | Wilkins | |
| 2010/0185545 A1 | 7/2010 | Royyuru | |
| 2010/0211505 A1 | 8/2010 | Saunders | |
| 2010/0223186 A1* | 9/2010 | Hogan | G06Q 20/02 705/71 |
| 2010/0228668 A1 | 9/2010 | Hogan | |
| 2010/0235284 A1 | 9/2010 | Moore | |
| 2010/0258620 A1 | 10/2010 | Torreyson | |
| 2010/0291904 A1 | 11/2010 | Musfeldt | |
| 2010/0299267 A1 | 11/2010 | Faith et al. | |
| 2010/0306076 A1 | 12/2010 | Taveau | |
| 2010/0325041 A1 | 12/2010 | Berardi | |
| 2011/0010292 A1* | 1/2011 | Giordano | G06Q 20/04 705/39 |
| 2011/0016047 A1 | 1/2011 | Wu | |
| 2011/0016320 A1 | 1/2011 | Bergsten | |
| 2011/0040640 A1* | 2/2011 | Erikson | G06Q 20/10 705/18 |
| 2011/0047076 A1 | 2/2011 | Carlson et al. | |
| 2011/0083018 A1 | 4/2011 | Kesanupalli | |
| 2011/0087596 A1 | 4/2011 | Dorsey | |
| 2011/0093397 A1 | 4/2011 | Carlson | |
| 2011/0125597 A1 | 5/2011 | Oder, II | |
| 2011/0153437 A1 | 6/2011 | Archer | |
| 2011/0153498 A1 | 6/2011 | Makhotin et al. | |
| 2011/0154466 A1 | 6/2011 | Harper | |
| 2011/0161233 A1 | 6/2011 | Tieken | |
| 2011/0166992 A1* | 7/2011 | Dessert | G06Q 20/0655 705/39 |
| 2011/0178925 A1* | 7/2011 | Lindelsee | G06Q 20/40 705/44 |
| 2011/0178926 A1 | 7/2011 | Lindelsee et al. | |
| 2011/0191244 A1* | 8/2011 | Dai | G06Q 20/40 705/44 |
| 2011/0213711 A1 | 9/2011 | Skinner | |
| 2011/0238511 A1 | 9/2011 | Park | |
| 2011/0238573 A1 | 9/2011 | Varadarajan | |
| 2011/0246317 A1* | 10/2011 | Coppinger | G06Q 20/10 705/17 |
| 2011/0251892 A1 | 10/2011 | Laracey | |
| 2011/0258111 A1 | 10/2011 | Raj et al. | |
| 2011/0270751 A1 | 11/2011 | Csinger | |
| 2011/0272471 A1 | 11/2011 | Mullen | |
| 2011/0272478 A1 | 11/2011 | Mullen | |
| 2011/0276380 A1 | 11/2011 | Mullen | |
| 2011/0276381 A1 | 11/2011 | Mullen | |
| 2011/0276424 A1 | 11/2011 | Mullen | |
| 2011/0276425 A1 | 11/2011 | Mullen | |
| 2011/0288874 A1 | 11/2011 | Hinkamp | |
| 2011/0295745 A1 | 12/2011 | White | |
| 2011/0302081 A1 | 12/2011 | Saunders | |
| 2012/0023567 A1 | 1/2012 | Hammad | |
| 2012/0028609 A1 | 2/2012 | Hruska | |
| 2012/0030047 A1 | 2/2012 | Fuentes et al. | |
| 2012/0035998 A1 | 2/2012 | Chien | |
| 2012/0041881 A1 | 2/2012 | Basu | |
| 2012/0047237 A1 | 2/2012 | Arvidsson | |
| 2012/0066078 A1 | 3/2012 | Kingston | |
| 2012/0072350 A1 | 3/2012 | Goldthwaite | |
| 2012/0078735 A1 | 3/2012 | Bauer | |
| 2012/0078798 A1 | 3/2012 | Downing | |
| 2012/0078799 A1* | 3/2012 | Jackson | G06Q 20/10 705/67 |
| 2012/0095852 A1 | 4/2012 | Bauer | |
| 2012/0095865 A1 | 4/2012 | Doherty | |
| 2012/0101833 A1* | 4/2012 | Pitroda | G06Q 20/42 705/1.1 |
| 2012/0116902 A1 | 5/2012 | Cardina | |
| 2012/0123882 A1* | 5/2012 | Carlson | G06Q 20/02 705/16 |
| 2012/0123940 A1 | 5/2012 | Killian | |
| 2012/0129514 A1 | 5/2012 | Beenau | |
| 2012/0143767 A1 | 6/2012 | Abadir | |
| 2012/0143772 A1 | 6/2012 | Abadir | |
| 2012/0158580 A1 | 6/2012 | Eram | |
| 2012/0158593 A1 | 6/2012 | Garfinkle | |
| 2012/0173431 A1 | 7/2012 | Ritchie | |
| 2012/0185386 A1 | 7/2012 | Salama | |
| 2012/0197807 A1 | 8/2012 | Schlesser | |
| 2012/0203664 A1 | 8/2012 | Torossian | |
| 2012/0203666 A1 | 8/2012 | Torossian | |
| 2012/0215688 A1 | 8/2012 | Musser | |
| 2012/0215696 A1 | 8/2012 | Salonen | |
| 2012/0221421 A1 | 8/2012 | Hammad | |
| 2012/0221468 A1* | 8/2012 | Kumnick | G06Q 20/20 705/44 |
| 2012/0226580 A1* | 9/2012 | Raghavan | G06Q 30/06 705/26.41 |
| 2012/0226582 A1 | 9/2012 | Hammad | |
| 2012/0231844 A1 | 9/2012 | Coppinger | |
| 2012/0233004 A1 | 9/2012 | Bercaw | |
| 2012/0246070 A1 | 9/2012 | Vadhri | |
| 2012/0246071 A1 | 9/2012 | Jain | |
| 2012/0246079 A1 | 9/2012 | Wilson et al. | |
| 2012/0265631 A1 | 10/2012 | Cronic | |
| 2012/0271770 A1 | 10/2012 | Harris | |
| 2012/0297446 A1 | 11/2012 | Webb | |
| 2012/0300932 A1 | 11/2012 | Cambridge | |
| 2012/0303503 A1 | 11/2012 | Cambridge | |
| 2012/0303961 A1 | 11/2012 | Kean | |
| 2012/0304273 A1 | 11/2012 | Bailey | |
| 2012/0310725 A1 | 12/2012 | Chien | |
| 2012/0310831 A1 | 12/2012 | Harris | |
| 2012/0316992 A1 | 12/2012 | Oborne | |
| 2012/0317035 A1 | 12/2012 | Royyuru | |

(56) References Cited

U.S. PATENT DOCUMENTS

| | | |
|---|---|---|
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0024377 A1* | 1/2013 | Stong .................... G06Q 20/10 705/44 |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0073365 A1* | 3/2013 | McCarthy .............. G06Q 20/02 705/14.23 |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0124422 A1 | 5/2013 | Hubert |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1* | 9/2013 | Dessert ................ G06Q 20/367 705/41 |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304648 A1 | 11/2013 | O'Connell |
| 2013/0304649 A1 | 11/2013 | Cronic |
| 2013/0308778 A1 | 11/2013 | Fosmark |
| 2013/0311313 A1 | 11/2013 | Laracey |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025582 A1 | 1/2014 | Maevsky |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1* | 2/2014 | Plomske .......... G06Q 20/38215 705/64 |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142544 A1* | 5/2015 | Tietzen .............. G06Q 20/3224 705/14.23 |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |

(56) References Cited

U.S. PATENT DOCUMENTS

| | | |
|---|---|---|
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

"A Complete Secure Customer Centric Anonymous Payment in a Digital EcoSystem"; Vorugunti Chandra Sekhar and Mrudula S; 'A Complete Secure Customer Centric Anonymous Payment in a Digital EcoSystem.pdf' (Year: 2012).*

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., , U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Valcourt et al., "Investigating mobile payment: supporting technologies, methods, and use"; file ' Investigating mobile payment—supporting technologies methods and use.pdf ; Jan. 1, 2005 (Year: 2005).

Non-Final Office Action, dated Jan. 2, 2019, in U.S. Appl. No. 14/305,930, 47 pages.

Non-Final Office Action, dated Jun. 26, 2017, in U.S. Appl. No. 14/305,930, 25 pages.

Final Office Action, dated Dec. 28, 2017, in U.S. Appl. No. 14/305,930, 32 pages.

U.S. Appl. No. 14/305,930 , "Final Office Action", dated Jul. 10, 2019, 39 pages.

* cited by examiner

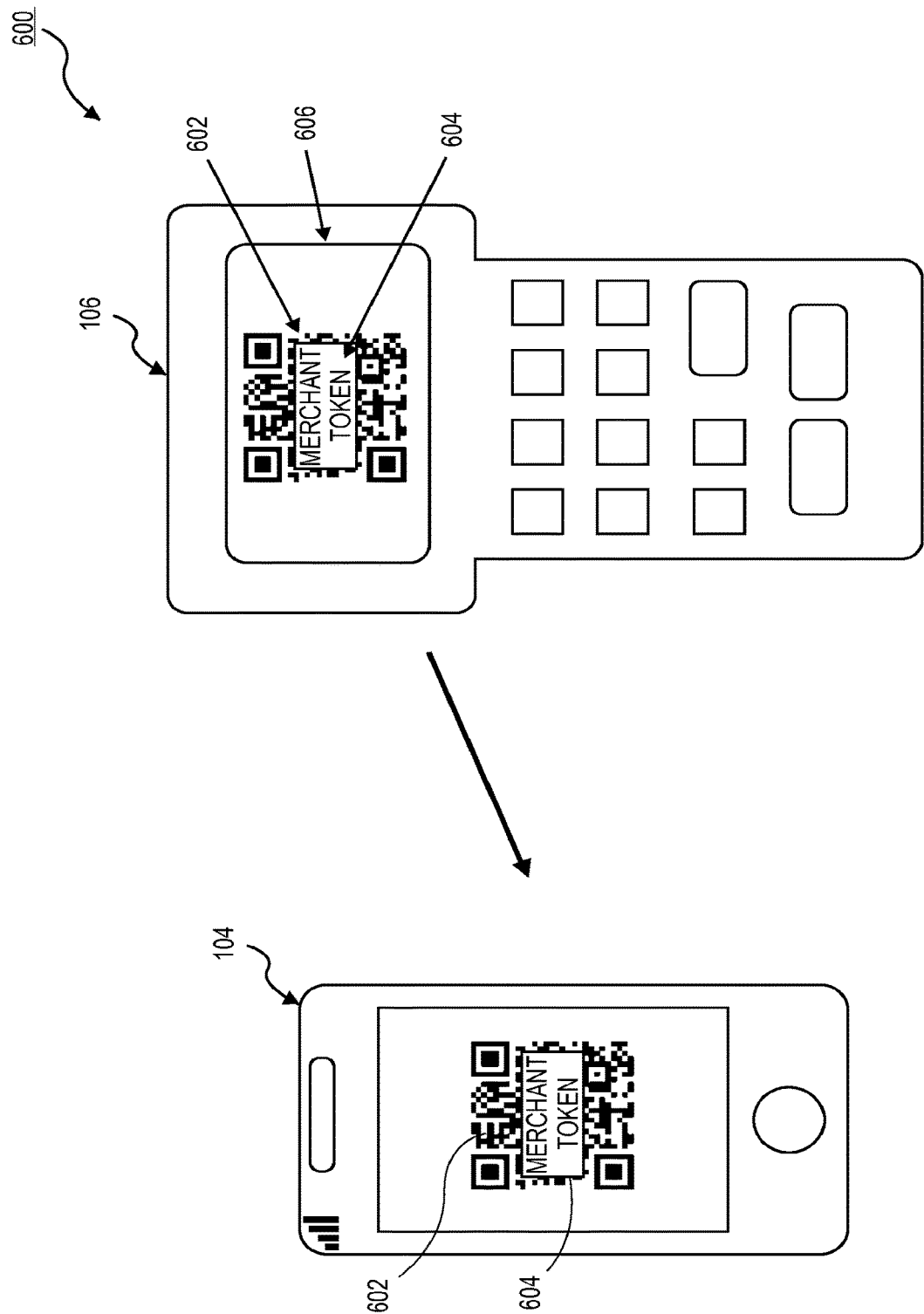

SYSTEM AND METHOD USING AUTHORIZATION AND DIRECT CREDIT MESSAGING

CROSS-REFERENCES TO RELATED APPLICATIONS

This application is a divisional application of U.S. patent Ser. No. 14/305,930, filed on Jun. 16, 2014, which is a non-provisional application of and claims the benefit of priority of U.S. Provisional Application No. 61/835,793, filed on Jun. 17, 2013, which are herein incorporated by reference in its entirety for all purposes.

BACKGROUND

In a typical electronic payment transaction, a consumer provides an account number to a merchant to conduct a financial transaction and the merchant requests a payment processing network to debit (i.e., "pull") money from the consumer's account to the merchant's account. For example, in a transaction, a merchant can generate an authorization request message using the consumer account information and transaction information and can send it to an issuer for authorization. If the transaction is authorized by the issuer, money for the transaction may be transferred to the merchant account from the consumer's account at the issuer. However, in such transactions, the consumer's account information could be compromised (e.g., by unscrupulous merchants, merchant employees, identity thieves, etc.). Better ways to secure consumer account information would be desirable.

Embodiments of the invention address these and other problems, individually and collectively.

BRIEF SUMMARY

In embodiments of the invention, a merchant computer can generate a token including a "pay-me" merchant account identifier and transaction data for a transaction conducted by a consumer. The merchant token can be obtained by a mobile communication device and transmitted to a payment processing network along with a device identifier for the mobile communication device and an authentication token provided by the consumer. The payment processing network can authenticate the mobile communication device using the authentication token, retrieve a consumer account number based on the mobile communication device identifier, and complete the transaction by pushing money into the merchant "pay-me" account from the consumer account.

One embodiment of the invention is directed to a method comprising receiving, by a mobile communication device, a merchant token from an access device for a transaction. The merchant token comprises a merchant account identifier (e.g., for a merchant credit only account), and transaction data. The method further comprises receiving, by the mobile communication device, an authentication token from a consumer operating the mobile communication device, and generating, by the mobile communication device, a transaction request message comprising the merchant token and the authentication token. The method further includes sending, by the mobile communication device, the transaction request message to a server computer, and receiving a confirmation message that the transaction has been processed.

Another embodiment of the invention is directed to a mobile communication device that is configured to perform the above-described method.

Another embodiment of the invention is directed to a method. The method comprises receiving, by a server computer, a transaction request message comprising a merchant token comprising a merchant account identifier, transaction data comprising a transaction amount, and a mobile communication device identifier or a consumer account identifier. The method also includes generating, by the server computer, an authorization request message comprising the transaction amount and the consumer account identifier, and sending, by the server computer, the authorization request message comprising the consumer account identifier to an issuer computer operated by an issuer that issued the consumer account identifier. The method also includes receiving, by the server computer, an authorization response message from the issuer computer comprising the consumer account identifier, and replacing, by the server computer, the consumer account identifier with the merchant account identifier to create a modified authorization response message. The method also includes sending, by the server computer, the modified authorization response message to the merchant.

Another embodiment of the invention is directed to a server computer that is configured to perform the above-described method.

These and other embodiments are described in further detail below.

BRIEF DESCRIPTION OF THE DRAWINGS

FIG. 6 illustrates exemplary screen shots of a mobile phone and an access device displaying a QR™ code including a merchant token in one embodiment of the invention.

DETAILED DESCRIPTION

Figure 1:
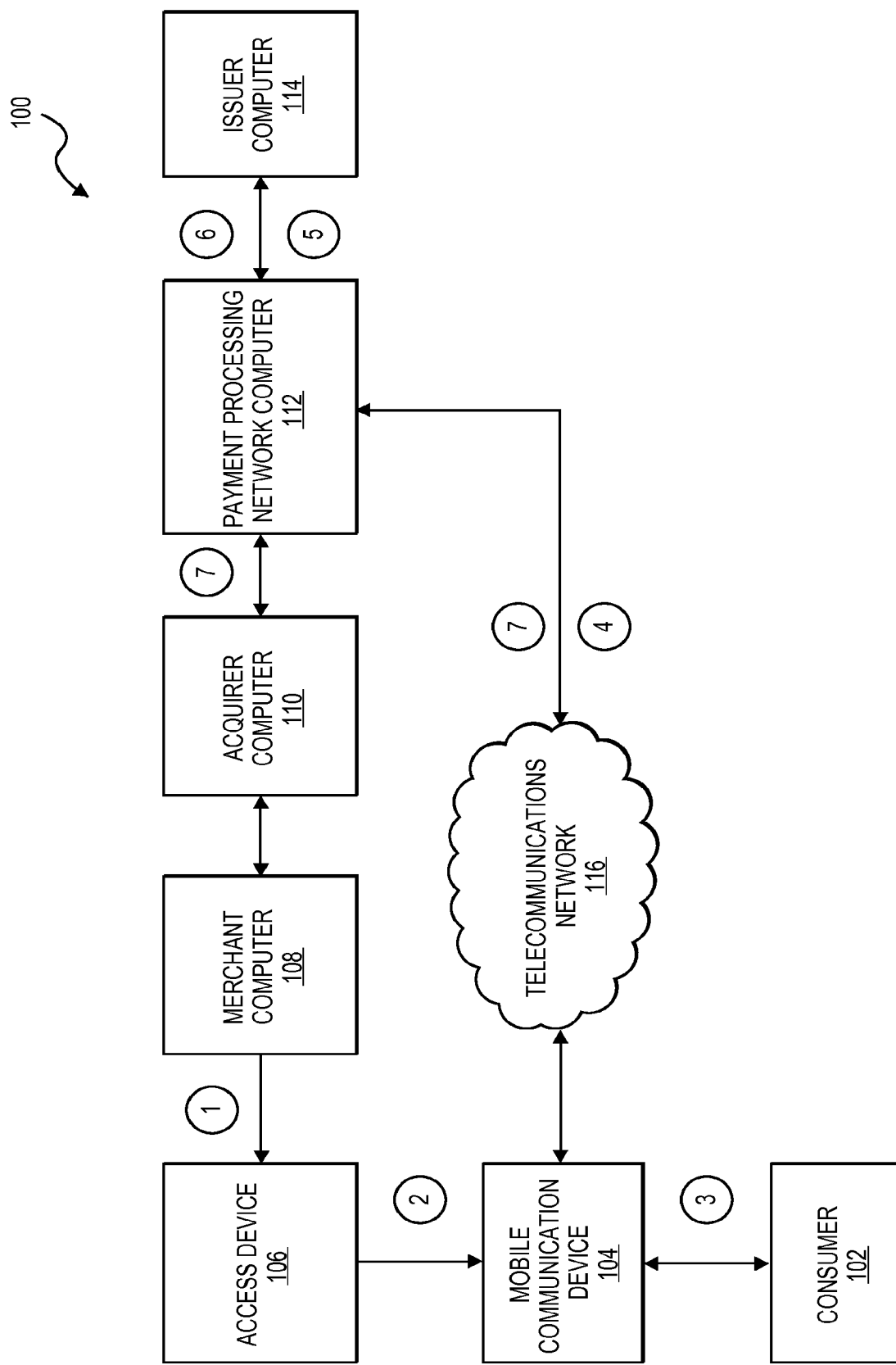
FIG. 1 illustrates a transaction processing system in one embodiment of the present invention.

Embodiments of the invention are directed to methods and systems for processing transactions using a merchant generated "pay-me" token (i.e., account identifier) to complete a transaction through a "push" type of transaction.

Typical payment transactions include a consumer providing a merchant an account identifier and the merchant "pulling" money from the consumer's account. However, these transactions can be unsecure because the consumer gives their account identifier as well as authentication credentials to the entity they wish to pay. However, embodiments of the present invention may complete a transaction using a push transaction mechanism where a merchant can provide an account identifier to a consumer and the consumer can "push" money from their account to the merchant's account associated with the merchant account identifier.

For example, in one embodiment, a consumer may desire to purchase goods or services from a merchant and may approach a merchant point-of-sale terminal to pay for the goods or services. The merchant may scan the products into a merchant computer and may generate a pay-me token (e.g., a merchant token) that may be sent to an access device. The pay-me token may be in the form of a machine readable code, for example, a QR™ code, and may comprise a merchant account identifier as well as transaction data (e.g., transaction amount, product codes, etc.). The access device may display the QR™ code to the consumer. The consumer may scan the QR™ code from the access device with their phone or other portable device. The consumer may then authenticate the transaction by providing an authentication token to the phone (e.g., by stating a requested word or statement or via other means). The phone may then submit a transaction request including the merchant token, a device identifier (e.g., phone number), and the authentication token to a payment processing network for transaction processing. The payment processing network may then determine the consumer's account using the phone number, may authenticate the consumer using the authentication token, and may transfer money from the consumer's account to the merchant account associated with the merchant account identifier. Accordingly, a transaction may be processed without the consumer's account information being transferred to the merchant or otherwise sent over a communications network.

Accordingly, push payment transactions provide better security for consumers because the consumer's account information is not passed to a wide number of entities (some of which may have malicious or fraudulent intent) and the consumer's account information is only passed within a secure payment channel. Additionally, consumers are provided with additional transaction processing options including the use of a mobile communication device. Furthermore, the push payments are more secure and convenient for merchants because the merchants do not have to store sensitive consumer account information.

Prior to discussing embodiments of the invention, it may be helpful to describe some terms that are used in this application.

A "mobile communication device" may include any suitable wireless device. For example, the mobile communication device may be a smart phone with the capability to connect to a telecommunications network. A mobile communication device may include a device identifier. For example, the device identifier may be a phone number, a digital wallet identifier, a serial number, a SIM card number or any other identifier that can identify the mobile communication device. In some embodiments, the mobile communication device can have the capability to scan a machine readable code such as a QR™ code on a display. In some embodiments, the mobile communication device can have the capability to communicate with a POS terminal using a short range communication technology such as Near Field Communication (NFC).

A "consumer" may be an individual such as a person. The terms "consumer" and "user" may be used interchangeably in this specification.

A "consumer account number" may be an account number associated with a consumer. For example, a consumer account number may be a payment account number such as a primary account number, e.g., credit, debit, loyalty or prepaid account number. The consumer account number may be issued by an issuer such as a bank. In some embodiments, a consumer account number may be associated with a device identifier (e.g., a mobile phone number of a consumer).

A "merchant token" may include any suitable information associated with a merchant. In some embodiments, a merchant token may include a merchant account identifier, for example, a financial account number associated with a merchant. In some embodiments, a merchant token may also include an expiration date along with a merchant account number. In some embodiments, a merchant token may also include transaction data, for example, a transaction amount, a timestamp, a location of the transaction, product codes, etc. In some embodiments, a merchant token may also include a merchant identifier. In some embodiments, the merchant token may be represented in the form of a machine readable code such as a QR™ code, a bar code, etc.

A "merchant account identifier" may include an identifier for an account associated with a merchant. In some embodiments, a merchant account identifier may include an account number and an expiration date. For example, the account number may be associated with a credit or deposit only bank account of the merchant. In some embodiments, the merchant bank account may be associated with an acquirer/issuer. It may also be in the form of a traditional PAN (primary account number) so that it may be routed in an ISO message in a normal credit or debit card transaction. A traditional PAN typically has sixteen characters and the first six characters form the BIN or bank identification number. However, the BIN of the PAN of a merchant account identifier would be a merchant identification number rather than a bank identification number. The merchant account identifier may be static or dynamic. In some embodiments, the merchant account identifier is dynamic. The dynamic merchant account identifier may be used as both a transaction ID to identify the particular transaction being conducted (e.g., to match the authorization of the transaction to the transaction details) as well as a way to route the authorization response to the correct merchant.

An "access device" may include a device that may be configured to interact with a consumer mobile device. In some embodiments, the access device may be any suitable device for communicating with a merchant computer or a payment processing network, and for interacting with a user computer apparatus, and/or a user mobile communication device. In some embodiments, an access device may be configured to display a machine readable code such as a QR™ code generated by another device such as a merchant computer or a backend server. An access device may generally be located in any suitable location, such as at the location of a merchant.

An access device may be in any suitable form. Some non-limiting examples of access devices include point-of-sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a payment device and/or mobile device.

A "merchant account" may refer to an account associated with a merchant. In some embodiments, the merchant account may be a credit only account or deposit only account. For example, the merchant account may only allow deposits into the account but may not allow withdrawals from the account. In some embodiments, the merchant account may be associated with an acquirer, for example, the acquirer may manage the merchant account.

"Transaction data" may include data related to a transaction. For example, in some embodiments, the transaction data may include one or more of a transaction amount, a timestamp (e.g., date and time) of the transaction, a location of the transaction, number of items, item details, product code (e.g., SKU numbers), etc. In some embodiments, transaction data may be determined by a merchant computer after scanning the goods or products the consumer may desire to purchase.

An "authentication token" may include any suitable information that can authenticate a consumer. In some embodiments, the authentication token may be provided by the consumer to authenticate for a transaction using a mobile communication device, e.g., to validate if the consumer is the authorized user of the mobile communication device. In some embodiments, an authentication token may include a biometric identifier associated with the consumer such as voice, fingerprints, iris, face, signature, hand geometry, etc. In some embodiments, the consumer may register one or more authentication tokens with a server computer that may store these authentication tokens to authenticate the consumer for future transactions.

A "transaction request message" may include a message for a transaction request. In some embodiments, a transaction request message may be provided by a mobile communication device to a server computer to process a transaction request. In some embodiments, a transaction request message may include a merchant token, a mobile communication device identifier or consumer account number (which may be a real account number or a pseudo PAN, which is a PAN that is linked to the real account number but is not the real account number), and an authentication token. For example, a merchant token may include a merchant account identifier, a mobile communication device identifier may include a phone number and an authentication token may include a voice input of a consumer initiating the transaction request.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

A "server computer" can be a powerful computer or a cluster of computers. For example, the server computer can be a large mainframe, a minicomputer cluster, or a group of servers functioning as a unit. In one example, the server computer may be a database server coupled to a Web server.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

FIG. 1 shows a transaction processing system in one embodiment of the present invention.

A transaction processing system 100 may include a consumer 102, a mobile communication device 104, an access device 106, a merchant computer 108, an acquirer computer 110, a payment processing network computer 112, an issuer computer 114 and a telecommunications network 116.

The consumer 102 may operate the mobile communication device 104 to initiate a transaction at the access device 106. The access device 106 may be associated with or operated by the merchant computer 108. The mobile communication device 104 may be configured to communicate with the payment processing network computer 112 through the telecommunications network 116. The telecommunications network 116 may include any suitable network that is capable of transmitting information between two entities and may be capable of using any suitable communications protocol (e.g., cellular network, TCP/IP, etc.)

In some embodiments of the invention, the consumer 102 may register one or more authentication tokens in an authentication payment program associated with a payment processing network. For example, the consumer 102 may provide one or more biometric samples such as voice, fingerprints, iris, face, signature, hand geometry, etc. to the payment processing network computer 112 by operating the mobile communication device 104. For example, the mobile communication device 104 may be a smart phone with the capability to connect to the telecommunications network 116. The mobile communication device 104 can comprise one or more input interfaces (e.g., a microphone, camera, touch screen, etc.) to allow the consumer 102 to input information for enrolling the authentication tokens.

The mobile communication device 104 may be a mobile phone, a tablet, a notebook, a PDA, a laptop, a netbook, a key fob, etc. In some embodiments, a device identifier may be associated with the mobile communication device 104. For example, the device identifier may be a phone number, a digital wallet identifier, a serial number, a SIM card number or any other identifier that can identify the mobile communication device 104. The mobile communication device 104 may be capable of reading a machine readable code such as a QR™ code displayed by the access device 106. For example, the consumer 102 may scan a QR™ code associated with a transaction displayed on a display of the access device 106 using a camera or a scanning device on the mobile communication device 104. The QR™ code may include a merchant token, e.g., a pay-me token generated by the merchant computer 108. The mobile communication device 104 may also allow the consumer 102 to provide an authentication token for authentication. The mobile communication device 104 may also be capable of generating a transaction request message including the merchant token, the authentication token provided by the consumer 102 and the device identifier. FIG. 6 illustrates an exemplary QR™ code 602 captured by the mobile device 104 from the access device 106. The QR™ code 602 may include a merchant token 604.

Referring back to FIG. 1, the access device 106 may be an access point to a transaction processing system that comprises the payment processing network computer 112 and the issuer computer 114. In some embodiments, the access device 106 may be configured to display a token generated by the merchant computer 108 in a format that may be read by the mobile communication device 104 including machine readable codes such as a QR™ code, a bar code, or any other information transfer mechanism. For example, the merchant token may include a merchant account identifier (e.g., a bank account number) associated with a merchant account that may be used for a transaction and transaction data associated with the transaction. In some embodiments, the merchant account associated with the merchant account identifier may be a credit only or a deposit only account. For example, the merchant account may not allow withdrawals from the account and may only allow deposits into the account. As shown in FIG. 6, the access device 106 displays the QR™ code 602 that includes the merchant token 604 on a display 606.

Referring back to FIG. 1, the merchant computer 108 may be configured to generate a merchant token. In some embodiments, the merchant token may comprise a merchant account identifier and transaction data. For example, the merchant account identifier may correspond to a merchant bank account associated with the acquirer computer 110. In some embodiments, the acquirer computer 110 and the issuer computer 114 may be associated with the same financial entity, e.g., a bank. The merchant computer 108 may be configured to communicate with the acquirer computer 110 via any suitable communication network such as TCP/IP. The merchant computer 108 may provide the merchant token to the access device 106 that may be coupled to the merchant computer 108. In some embodiments, the merchant token may be in the form of a machine readable code such as a QR™ code or a bar code. In some embodiments, the merchant computer 108 and the access device 106 may be integrated as a POS device that can generate a merchant token and display the merchant token on a display screen of the POS device as a machine readable code. In some embodiments, a merchant token may be referred to as a "pay-me" token.

The merchant generated "pay-me" token may include both a static or dynamic merchant account identifier as well as dynamic transaction information. The static merchant or dynamic merchant account identifier may identify a merchant "pay-me" account at an issuer that may be used for credit transactions. For example, the merchant account identifier may be used to identify or be associated with a merchant credit account at an issuer that can only be used to transfer money to the account. Generally, credit only merchant accounts do not have security risks that may be associated with the debit accounts (which allow debit transactions) and may be published widely. Accordingly, the merchant account identifier provided by the merchant token is not secure information that must be protected from malicious third parties (as money can only be transferred to the account).

The acquirer computer 110 may be associated with an acquirer. The acquirer may issue and manage a financial account for the merchant, e.g. associated with a merchant account identifier. The acquirer computer 110 may be communicatively coupled to the merchant computer 108 and the payment processing network computer 112. In some embodiments, the acquirer computer 110 may receive an authorization response message from the payment processing network computer 112 for a transaction and may forward it to the merchant computer 108 to confirm processing of the transaction.

The payment processing network computer 112 may be associated with a payment processing network. A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may use any suitable wired or wireless telecommunications network, including the Internet.

In some embodiments, the payment processing network computer 112 may store authentication tokens for a plurality of consumers in an authentication token database (not shown), e.g. via a registration process. For example, one or more authentication tokens for each consumer may be stored in the authentication token database based on a device identifier and/or an account identifier (e.g., a primary account number (PAN)) associated with the consumer during an enrollment or registration process. In some embodiments, the payment processing network computer 112 may determine a consumer account from a consumer account database (not shown) based on the device identifier. In some embodiments, the payment processing network computer 112 may determine a merchant account to which the money may be pushed from the consumer account based on a merchant account identifier received in a transaction request message.

The issuer computer 114 may be associated with an issuer. An issuer can be any bank that can issue and maintain a financial account for a user, e.g., consumer 102. Some systems can perform both issuer and acquirer functions. When a transaction involves a payment account associated with the issuer computer 114, the issuer computer 114 may verify the account and respond with an authorization response message to the acquirer computer 110 via the payment processing network 112 that may forward it to the access device 106. The authorization response message may include an identifier to describe whether the transaction was approved or declined. The access device 106 may communicate to the consumer 102 about the outcome of the authorization based on the authorization response message.

An exemplary flow for completing a payment transaction, according to embodiments of the present invention is discussed with reference to FIG. 1. Before the transaction begins, the consumer 102 may select goods or services to purchase at a merchant location.

At step 1, the merchant may scan the goods or otherwise determine the subject of a transaction. After finalizing the products for the transaction, the merchant computer 108 may generate a pay-me token (or merchant token). In some embodiments, the machine readable code may include a merchant account identifier that has also been generated by the merchant, a transaction amount, and any other transaction details (e.g., a timestamp, number of items, line item details, product codes, etc.). The merchant account identifier may be static or dynamic in nature, and may also be in the form of a conventional credit or debit card PAN (primary account number). In some embodiments, if it is dynamic, then many dynamic merchant account identifiers could map directly to one deposit only real merchant account identifier for an account at the acquirer. A lookup table or an algorithm could be used to provide this mapping.

The merchant computer 108 may provide the merchant token to the access device 106 to interact with the consumer's mobile communication device 104. For example, the access device 106 may display the machine readable code that includes the merchant token. In some embodiments, the access device 106 may be capable of sending the merchant token through short-range communication technology (e.g., NFC elements, etc.), or the merchant token may be provided to the mobile communication device 104 through any other suitable method.

In other embodiments, the merchant computer 108 is not necessary and the access device 106 may generate the merchant token instead of the merchant computer 108.

Further, in some embodiments, if the merchant account identifier is generated on a per transaction or otherwise periodic basis, the merchant account identifier may also be transmitted to the acquirer computer 110 so that the acquirer is aware that this merchant account identifier has been created by the merchant. In this way, the acquirer will recognize any subsequently transmitted authorization response message coming from the payment processing network computer 112, even though a corresponding authorization request message comprising the merchant account identifier was never created or transmitted.

At step 2, the consumer 102 may read or receive the merchant token at their mobile communication device 104 from the access device 106. For example, the consumer 102 may scan the machine readable code, or other displayed object with their mobile communication device 104 to obtain the merchant token from the access device 106. Alternatively, the consumer 102 may wave their mobile communication device 104 close to the access device 106 to receive the merchant token via a short range communication technology such as NFC. Any other suitable form of communication between the mobile communication device 104 and the access device 106 may be used for transfer of the merchant token to the mobile communication device 104.

At step 3, the mobile communication device 104 may decode the machine readable code received from the access device 106 and display the transaction details to the consumer 102. The mobile communication device 104 may prompt the consumer 102 for authorization to submit the transaction for processing. For example, the mobile communication device 104 may prompt the consumer 102 to provide an authentication token. The consumer 102 may then provide authorization by providing an authentication token. The authentication token may be in the form of a biometric identifier such as voice, fingerprint, iris, facial expression, hand geometry, etc., a passcode, a password, a personal identification number (PIN), etc.

In some embodiments, the consumer 102 can authorize the transaction by stating a requested word or statement (e.g., a password, a PIN or a pre-determined word or statement) using their voice. In some embodiments, the mobile communication device 104 may prompt the consumer 102 to read a word, an alphanumeric string or a statement displayed by the mobile communication device 104. For example, the consumer 102 may speak into the mobile communication device 104, and the mobile communication device 104 can transmit a sample of the user's voice or a digital artifact of the user's voice to the payment processing network computer 112. The voice sample provided by the consumer 102 may be used for signing or approving the transaction. This may help ensure that the mobile communication device 104 was not stolen or that the account is not being used by a malicious third party. Voice authentication technology or speaker verification technology may be used to validate that the consumer 102 is the authorized user to initiate the transaction using the mobile communication device 104. Furthermore, the voice recording could be saved as a proof that the consumer 102 approved or initiated the transaction. Alternatively, or additionally, the consumer 102 may provide a password, a passcode or a PIN using a keypad or a touch screen interface of the mobile communication device 104.

At step 4, a transaction request message may be generated by the mobile communication device 104 and may be sent to the payment processing network computer 112 through the telecommunications network 116. The mobile communication device 104 may generate a transaction request message comprising the merchant token, a device identifier or consumer primary account number, and an authentication token. In some embodiments, the device identifier and/or the authentication token need not be present in the transaction request message. For example, the authentication token may be provided to the payment processing network computer 112 at a later time or or not at all. Once the transaction request message is generated, the mobile communication device 104 may then send the transaction request message to the payment processing network computer 112 for processing.

In other embodiments, the transaction request message can be sent to another server computer such as the acquirer computer or the issuer computer, and similar processing can be performed.

In some embodiments, before sending the transaction request message, the consumer 102 may further be prompted for confirmation that they would like to initiate a transaction. For example, the consumer 102 can press a submit button or otherwise interact with the mobile communication device 104 to indicate that the transaction details are correct and the transaction can be initiated.

The payment processing network computer 112 may receive the transaction request message from the mobile communication device 104 and may begin processing the transaction. In some embodiments, the payment processing network computer 112 may verify that the authentication token is associated with the device identifier. For example, based on the device identifier, the payment processing network computer 112 may retrieve one or more authentication samples stored in an authentication database for comparison. In some embodiments, authentication of the consumer 102 can be based on both a match score indicating how closely the captured voice sample matches to previously stored voice samples of the consumer 102 (called "a model of the user's voice"), and/or a pass or fail response indicating whether the voice sample is an accurate reproduction of the word string.

The consumer's voice sample can be authenticated in any suitable manner. In an embodiment, the systems and methods can use voice biometric techniques, specifically a variation of a conventional prompted text independent speaker verification system. Certain embodiments allow the use of a captured voice sample attempting to reproduce a word string having a random element to authenticate the consumer 102.

After determining that the consumer 102 is associated with the mobile communication device 104 that is enrolled in the system, the payment processing network computer 112 may determine an issuer and a consumer account associated with the device identifier if the device identifier is present in the transaction request message and the consumer account identifier is not in the transaction request message. The payment processing network computer 112 may determine a merchant pay-me account associated with the merchant account identifier and may start the process of transferring funds equal to the transaction amount to the merchant pay-me account from the consumer account.

At step 5, the payment processing network computer 112 may generate and send an authorization request message to the issuer computer 114 operated by the issuer of the consumer's account and may obtain authorization for the transaction. The authorization request message may contain the consumer's account identifier and the amount of the transaction.

At step 6, the issuer computer 114 may determine whether the transaction should be authorized and may generate an authorization response message that can comprise an indication of a transaction decision. The payment processing network computer 112 then can receive an authorization response message comprising the consumer account identifier from the issuer computer 114.

At step 7, the payment processing network computer 112 may substitute the merchant account identifier in the authorization response message to form a modified authorization response message. The modified authorization response message (or other confirmation message) may be sent to the merchant computer 108 and the access device 106, and optionally the mobile communication device 104 to inform the parties as to whether the transaction is approved or declined. The authorization response message may include the merchant identifier so that the authorization response message is routed to the proper merchant. Data in the authorization response message (e.g., a transaction ID, a timestamp, a dynamic merchant account identifier, etc.) may be used by the merchant to match the response to the transaction data for the transaction.

At the end of the day, the transaction can be cleared and settled between the acquirer computer 110 and the issuer computer 114 by the payment processing network 112. Funds may be transferred from the issuer computer to the merchant computer 108 during the settlement process. In a clearing process, clearing messages are sent between the acquirer computer 110, the payment processing network 12, and the issuer computer 114 to facilitate settlement. In some cases, AFT (account funding transaction) or OCT (original credit transaction) messages may be used to debit and credit the appropriate accounts.

Figure 2:
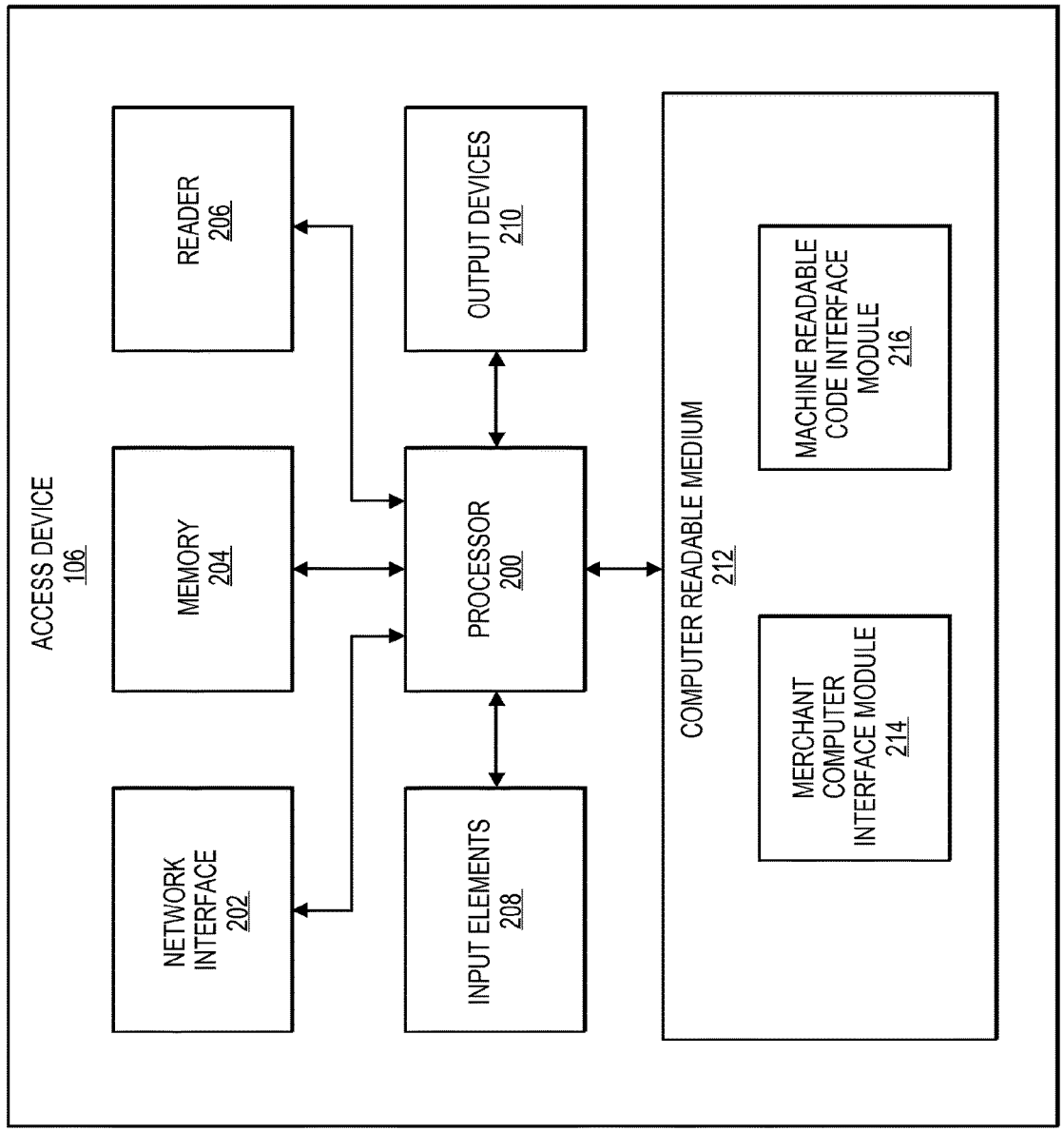
FIG. 2 illustrates some components of an access device in one embodiment of the invention.

FIG. 2 illustrates some components of an access device according to one embodiment of the invention.

The access device 106 may include a processor 200 coupled to a network interface 202, a memory 204, a reader 206, input elements 208, output devices 210 and a computer readable medium 212. The access device 106 may be an independent device, coupled to the merchant computer 108 or may be part of a POS terminal.

The computer readable medium 212 may comprise instructions or code, executable by the processor 200. The instructions may include instructions for displaying a machine readable code that includes a merchant token for a transaction. The computer readable medium 212 may be in the form of a memory that stores data and could be internal to the access device 106 or hosted remotely (i.e., cloud) and accessed wirelessly by the access device 106. The computer readable medium 212 may include a merchant computer interface module 214 and a machine readable code interface module 216.

The network interface 202 may be configured to enable the access device 106 to communicate with other entities (e.g., mobile communication device 104) using one or more communications networks.

The memory 204 may be internal to the access device 106 or hosted remotely (i.e., cloud) and accessed wirelessly by the access device 106. The memory 204 may be a combination of volatile and non-volatile memory. In some embodiments, the memory 204 may be used to store merchant tokens received from the merchant computer 108.

The reader 206 may include radio frequency (RF) antennas, magnetic stripe readers or any other suitable mechanism to interact with the mobile communications device 104. In some embodiments, the access device 106 may transfer a machine readable code using the RF antenna (e.g., based on short range communication technology) to a scanning device.

The input elements 208 may include a keypad, a touch screen, a microphone or any suitable element to provide information to the access device 106.

The output devices 210 may include a display screen, a speaker, a printer, etc. For example, the access device 106 can display a machine readable code on the display screen that the consumer 102 can scan using the mobile communication device 104. In some embodiments, a touch screen may be used as a display screen. The printer may be used to print a receipt for the transaction.

The merchant computer interface module 214 may be software that can cause the processor 200 in the access device 106 to exchange data with the merchant computer 108. For example, the merchant computer interface module 214 may include software that can allow the processor 200 in the access device 106 to receive a merchant token in the form of a machine readable code from the merchant computer 108. In some embodiments, the merchant computer interface module 214 may include software that causes the processor 200 in the access device 106 to receive a merchant token from the merchant computer 108 and to generate a machine readable code for access by the mobile communication device 104.

The machine readable code interface module 216 may include code that is executable by the processor 200 to cause the access device 106 to provide the machine readable code so that it can be accessed by the mobile communication device 104. In some embodiments, the machine readable code may be in the form of a QR™ code, a bar code or any suitable form to represent the merchant token that can be displayed on a display screen of the access device 106. For example, the machine readable code may be of any shape or size, may include any image, alpha-numeric characters, color, etc. In some embodiments, the machine readable code may be provided to the mobile communication device 104 by the access device 106 using radio waves (e.g., based on NFC).

Figure 3:
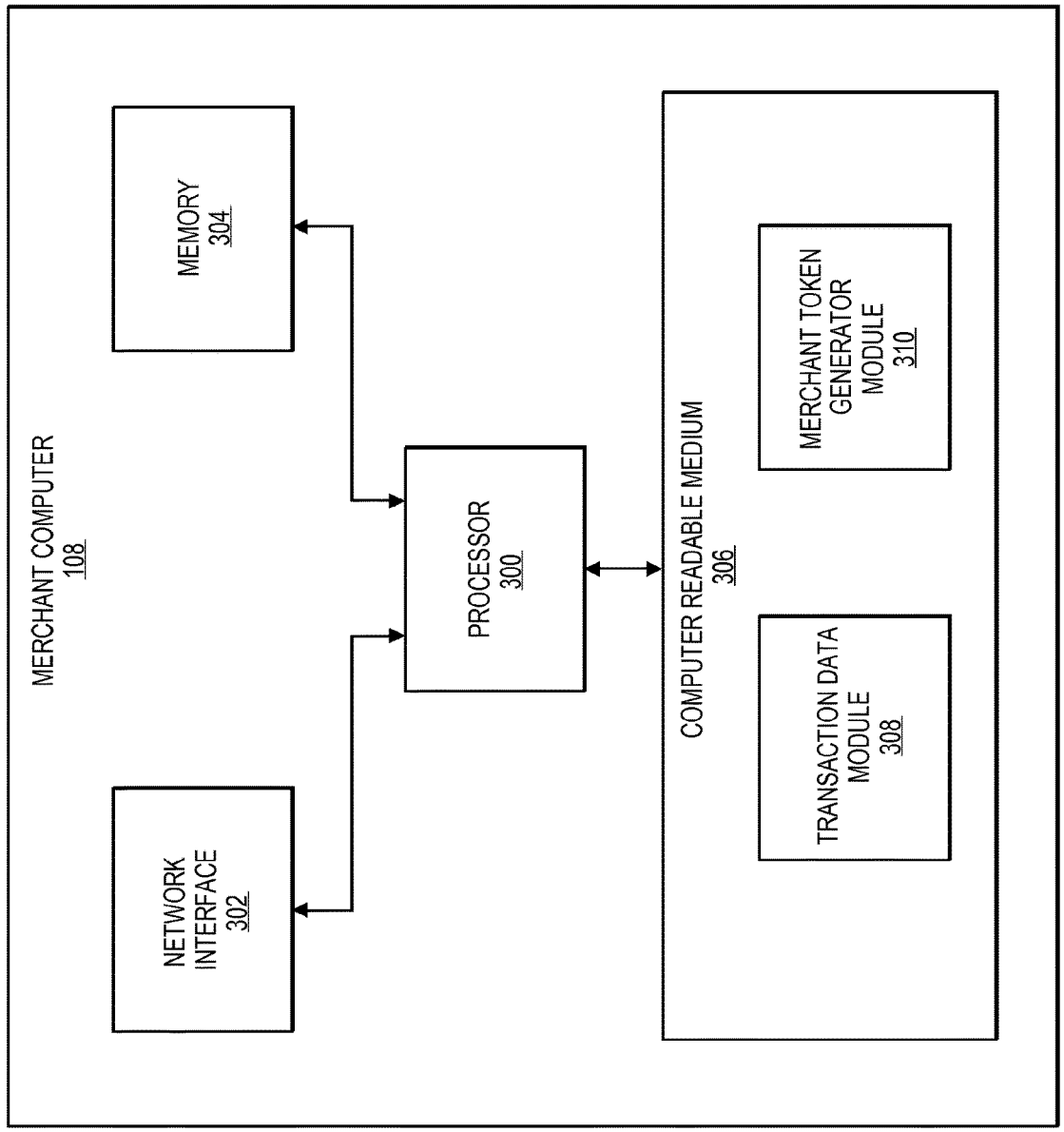
FIG. 3 illustrates some components of a merchant computer in one embodiment of the invention.

FIG. 3 illustrates some components of a merchant computer in one embodiment of the invention.

The merchant computer 108 may include a processor 300 coupled to a network interface 304, a memory 304 and a computer readable medium 306. The computer readable medium 306 may comprise code executable by the processor 300 for implementing methods using embodiments of the invention. The computer readable medium 306 may be in the form of a memory that stores data and could be internal to the merchant computer 108 or hosted remotely. The computer readable medium 306 may include a transaction data module 308 and a merchant token generator module 310.

The network interface 302 may be configured to enable the merchant computer 108 communicate with other entities (e.g., acquirer computer 110) using one or more communications networks.

The memory 304 may be internal to the merchant computer 108 or hosted remotely (i.e., cloud) and accessed wirelessly by the merchant computer 108. In some embodiments, the memory 304 may be used to store merchant inventory, merchant account information, etc.

The transaction data module 308 may determine transaction data associated with a transaction. For example, when a consumer brings items to a POS terminal for check out, transaction data related to the items for purchase may be entered in to the merchant computer 108 (e.g., by scanning a barcode or a SKU on the item). The transaction data may include a transaction amount, line item details, a timestamp, total number of items purchased, product codes, etc. Transaction data may be stored in a database (not shown) accessible to the merchant computer 108.

The merchant token generator module 310 may generate a pay-me token using the transaction data and a merchant account identifier. The merchant account identifier may be associated with a bank account of the merchant. In some embodiments, the merchant account identifier may be stored in the memory 304 or may be provided by the merchant. For example, the merchant computer 108 may be coupled to the access device 106 and/or an electronic cash register that can include input elements (e.g., keypad or touch screen) that can allow the merchant to manually enter a merchant account number. The merchant account identifier may be of certain length (e.g., up to 17 digits long) and it may or may not be encrypted. The bank account of the merchant may be associated with an acquirer that operates the acquirer computer 110. In some embodiments, the bank account may be deposit or credit only account, e.g., money cannot be withdrawn but can only be deposited into the account. In some embodiments, the merchant generated data may also include a merchant identifier that can identify a merchant, a merchant category, and any other relevant merchant information that may be necessary for processing of the transaction.

Figure 4A:
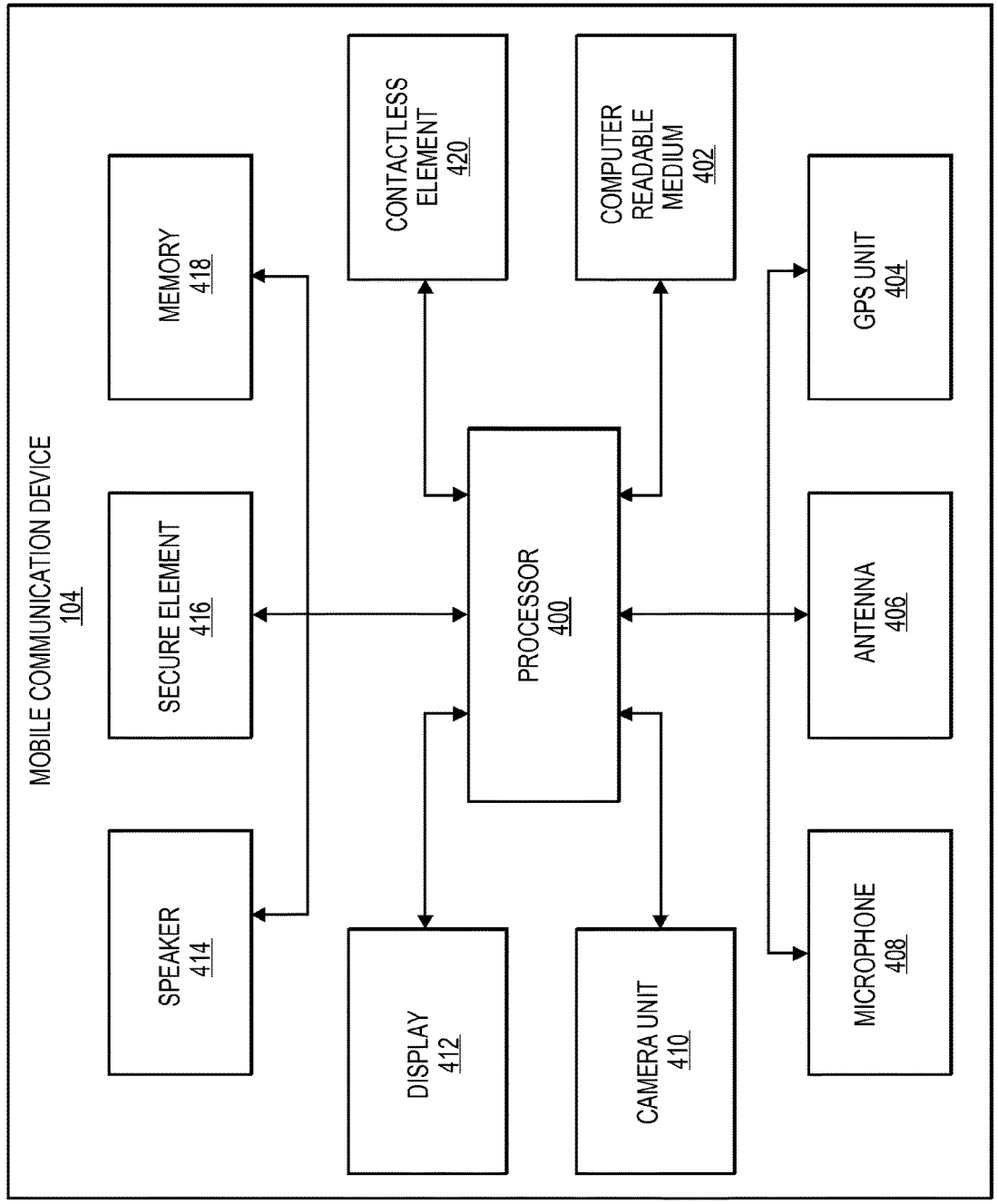
FIG. 4A illustrates some components of a mobile communication device in one embodiment of the invention.

FIG. 4A illustrates some components of the mobile communication device 104 in one embodiment of the invention.

The mobile communication device 104 may include a processor 400 or processing elements that may be configured to execute instructions or code in order to implement methods, processes or operations. The processor 400 may be communicatively coupled to a computer readable medium 402, a contactless element 420, a memory 418, a secure element 416, a speaker 414, a display 412, a camera unit 410, a microphone 408, an antenna 406, and a GPS unit 404.

The computer readable medium (CRM) 402 may comprise code executable by the processor 400 for implementing methods using embodiments of the invention. The CRM 402 may be in the form of a memory that stores data and could be internal to the mobile communication device 104 or hosted remotely (i.e., cloud) and accessed wirelessly by the mobile communication device 104. In some embodiments, the CRM 402 may include non-volatile, non-writable storage area (e.g., Flash ROM) where the firmware/operating system may reside. Non-volatile memory is memory that can retain the stored information even when not powered. Examples of non-volatile memory include read-only memory (see ROM), flash memory, most types of magnetic computer storage devices (e.g. hard disks, floppy discs and magnetic tape), optical discs, etc.

The contactless element 420 may typically be implemented in the form of a semiconductor chip (or other data storage element) with an associated wireless data transfer element such as an antenna. The contactless element 420 may be configured to exchange data and/or control instructions based on a short range communications capability, such as RFID, Bluetooth™, infra-red or any other suitable near fields communications (NFC) capability. In some embodiments of the invention, the mobile communication device 104 may receive a merchant token from the access device 106 via radio waves using the antenna 406 and the contactless element 420 when the consumer 102 starts the payment process using the mobile communication device 104.

The memory 418 may be internal to the mobile communication device 104 or hosted remotely (i.e., cloud) and accessed wirelessly by the mobile communication device 104. In some embodiments, the memory 418 may be configured as a volatile run-time memory and/or a cache. Volatile memory is memory that requires power to maintain the stored information (e.g., SRAM, DRAM, etc.). In some embodiments, the memory 418 may be used to store merchant tokens received from the access device 106 (e.g., in the form of a machine readable code).

The secure element 416 may be implemented as a separate secure smart card chip, in a SIM/UICC (Subscriber Identity Module/Universal Integrated Circuit Board), embedded in the mobile communication device 104, or in a removable card (e.g., Secure Digital card). The secure element 416 may be configured to securely store applications (e.g., a payment or wallet application), data (e.g., Personal Identification Information (e.g., consumer name, address, phone number, date-of-birth, etc.), Personal Account Information (account number, expiration date, CVV, dCVV, etc.), cryptographic keys, etc.) and provide for secure execution of applications. In some embodiments, the secure element 416 may also store a device identifier associated with the mobile communication device 104. For example, the device identifier may be a phone number (e.g., a 10 digit number including the area code), a serial number or a SIM card number. Although a secure element 416 is shown, in some embodiments, a secure element 416 is not needed and data that would otherwise be stored in the secure element may be stored in the cloud.

The display 412 may allow a user to view text, numbers, multimedia, and other information. In some embodiments, a graphical user interface may be provided on the display 412 for the consumer 102 to initiate a registration process to register one or more authentication tokens at a server computer or to initiate a transaction. In some embodiments, the display 412 may include a touch screen interface for the consumer 102 to interact with the mobile communication device 104 using the touch screen. In some embodiments, the consumer 102 may use a keypad (not shown) instead of as an alternative to the touch screen interface to enter data into the mobile communication device 104 (e.g., to provide a password or a PIN).

The camera unit 410 may be utilized by the consumer 102 to scan a machine readable code such as a QR® code. For example, the consumer 102 may scan a QR® code that can include a merchant token. The QR® code may be displayed on a display screen of the access device 106 where the consumer 102 may be performing a transaction. In some embodiments, instead of the camera unit 410, the machine readable code may be scanned by a scanning device coupled to the mobile communication device 104.

The GPS unit 404 may be utilized to determine a location of the mobile communication device 404. It will be understood that other methods of determining location such as network based positioning (e.g., using the antenna 406 coupled to the mobile communication device 104) or a hybrid positioning system may be used. Some other non-limiting examples to determine the location of the mobile communication device 104 may include handset based, SIM-based or WiFi based device tracking. In some embodiments, location of the mobile communication device 104 may be included in the transaction request message transmitted to the payment processing network computer 112. For example, a location of the mobile communication device 104 may be used to authenticate the transaction along with the authentication token.

The speaker 414 and microphone 408 may be configured to allow the consumer 102 hear and transmit voice respectively through the mobile communication device 104. For example, the consumer 102 can speak into the microphone 408 to record a voice sample that may be used to register the consumer's voice as an authentication token or to authenticate the consumer by comparing the voice sample with a previously stored authentication token stored in an authentication token database.

Figure 4B:
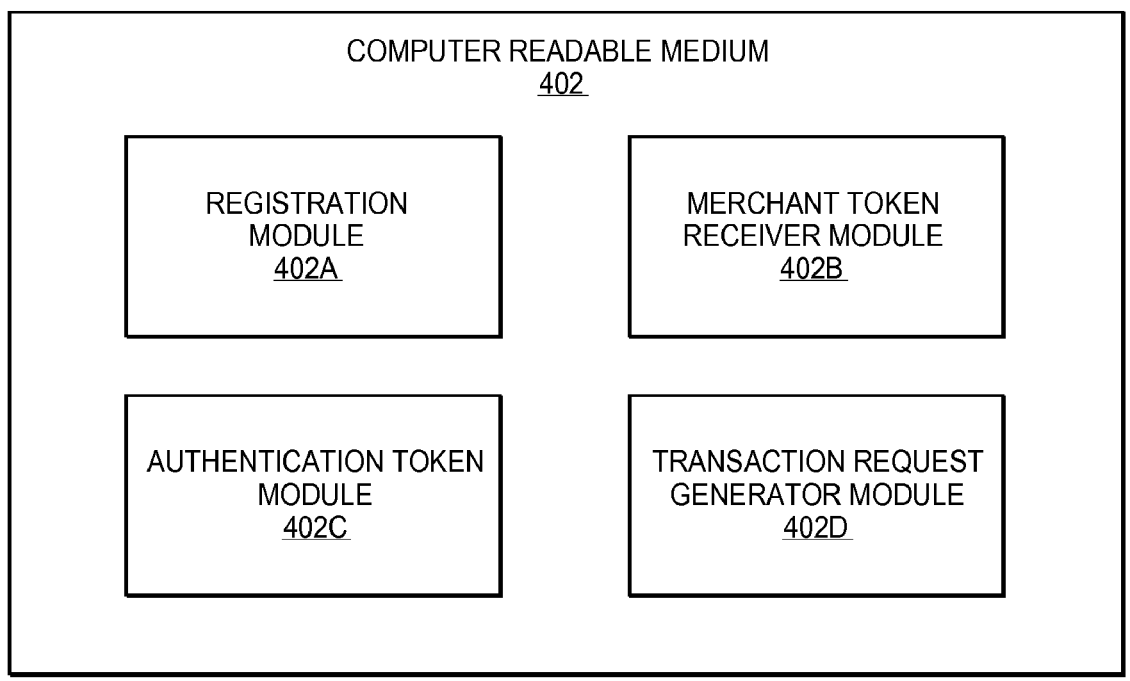
FIG. 4B illustrates components of a computer readable medium for a mobile communication device in one embodiment of the invention.

FIG. 4B illustrates components of the computer readable medium 402 in one embodiment of the invention.

The computer readable medium 402 may include a registration module 402A, a merchant token receiver module 402B, an authentication token module 402C and a transaction request generator module 402D.

Figure 7B:
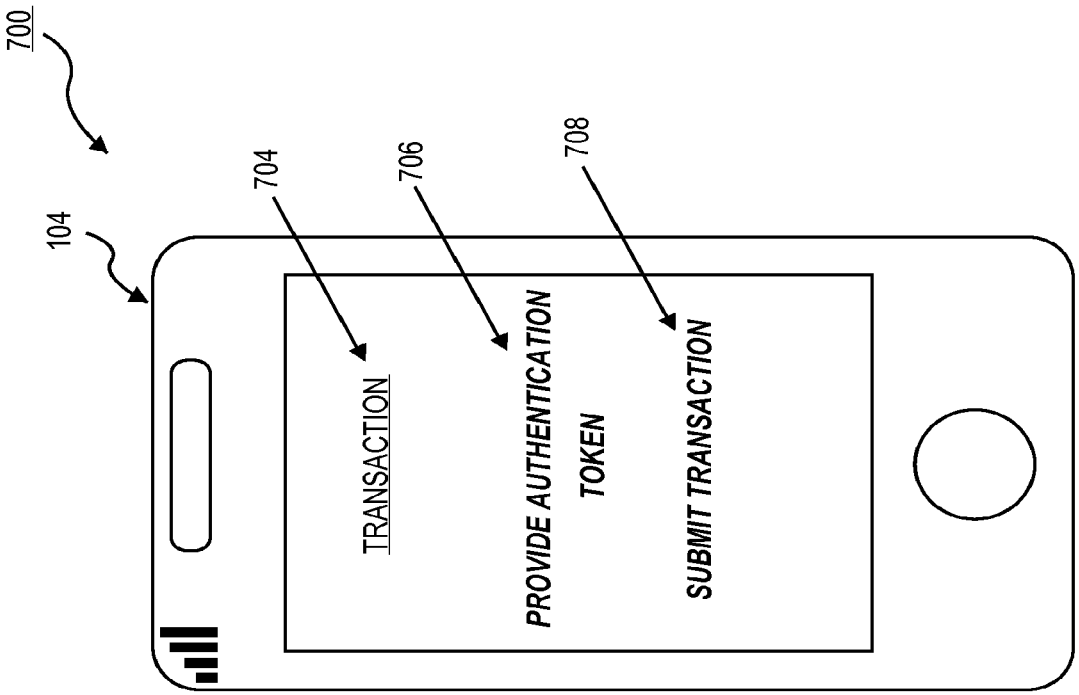
FIG. 7B illustrates an exemplary screen shot of a mobile phone to submit a transaction request in one embodiment of the invention.
Figure 7A:
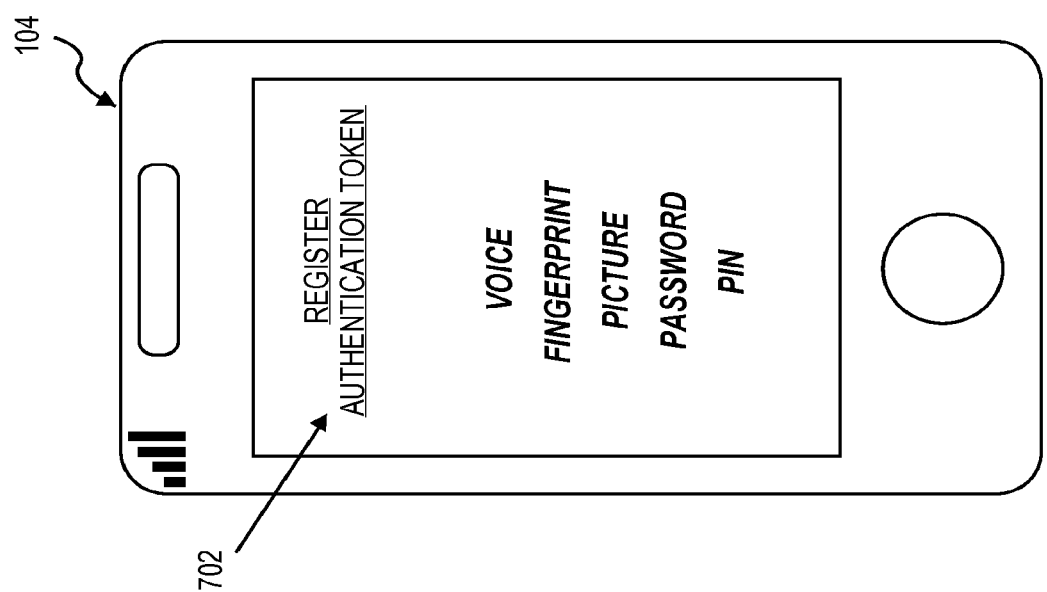
FIG. 7A illustrates an exemplary screen shot of a mobile phone to register an authentication token in one embodiment of the invention.

The registration module 402A may include computer code that can cause the processor 400 to enable a consumer to register one or more authentication tokens with a server computer (e.g., in a payment processing network). For example, the consumer 102 may log in to a website and upload one or more authentication token samples to register. FIG. 7A shows an exemplary screen shot of the mobile communication device 104 that can be used for registering an authentication token.

As shown in FIG. 7A, a webpage 702 may display prompts for the consumer 102 to register an authentication token using the mobile communication device 104. For example, the consumer 102 can record a voice sample by speaking into the microphone 408 of the mobile communication device 104. Alternatively or additionally, the consumer 102 can provide a fingerprint sample using the touch screen interface of the display 412 of the mobile communication device 104 or an external fingerprint scanner device (not shown) coupled to the mobile communication device 104. Alternatively or additionally, the consumer 102 can take their picture using the camera unit 410 on the mobile communication device 104. Alternatively or additionally, the consumer 102 can provide a password or a PIN using a keypad or a touch screen of the mobile communication device 104. In some embodiments, the webpage 702 may be hosted by a server computer associated with the payment processing network computer 112 or another entity. The one or more authentication tokens provided by the consumer 102 may be stored in an authentication database (e.g., in a payment processing network). The consumer 102 can register one or more authentication tokens with the payment processing network prior to conducting a transaction.

Referring back to FIG. 4B, the merchant token receiver module 402B may comprise code that can cause the processor 400 in the mobile communication device 104 to receive a merchant token. For example, the merchant token may be obtained by decoding a machine readable code captured from the access device 106, e.g., by scanning a QR™ code displayed on the access device 106. In some embodiments, the merchant token may be obtained from the access device 106 using a short range communication medium (e.g. NFC). The merchant token may include a merchant account identifier and transaction data.

The authentication token module 402C may comprise code that may cause the processor 400 in the mobile communication device 104 to prompt the consumer 102 to provide an authentication token to authenticate for the transaction. For example, after the consumer 102 has captured the merchant consumable token from the access device 106, a web page may prompt the consumer 102 to provide an authentication token before the transaction can be initiated. FIG. 7B shows an exemplary screen shot of the mobile communication device 104 for initiating a transaction.

As shown in FIG. 7B, a webpage 704 may prompt the consumer 102 to provide an authentication token (706). In some embodiments, the consumer 102 may be prompted to provide an authentication token to authenticate themselves before they can submit the transaction (708). For example, as discussed previously, the authentication token may be in the form of a biometric sample such as voice, fingerprint, iris, facial expression, hand geometry, etc., a passcode, a password, a personal identification number (PIN), etc. After providing the authentication token, the consumer 102 may select the submit transaction button to initiate the transaction. In some embodiments, transaction details (not shown) may be presented to the consumer 102 for the consumer 102 to verify the transaction details before selecting the submit transaction button.

Referring back to FIG. 4B, after the consumer 102 provides the authentication token to initiate the transaction, a transaction request message may be generated by the transaction request generator module 402D. In some embodiments, the transaction request message may include a merchant token (e.g., obtained by the merchant token receiver module 402B), an authentication token (e.g., obtained by the authentication token module 402C) and a device identifier of the mobile communication device 104. The transaction request message may be transmitted by the mobile communication device 104 to the payment processing network computer 112 via the telecommunications network 116. The mobile communication device 104 may receive a confirmation message (e.g., an SMS message or e-mail message) that the payment has been processed or after the transaction has been authorized.

Figure 5:
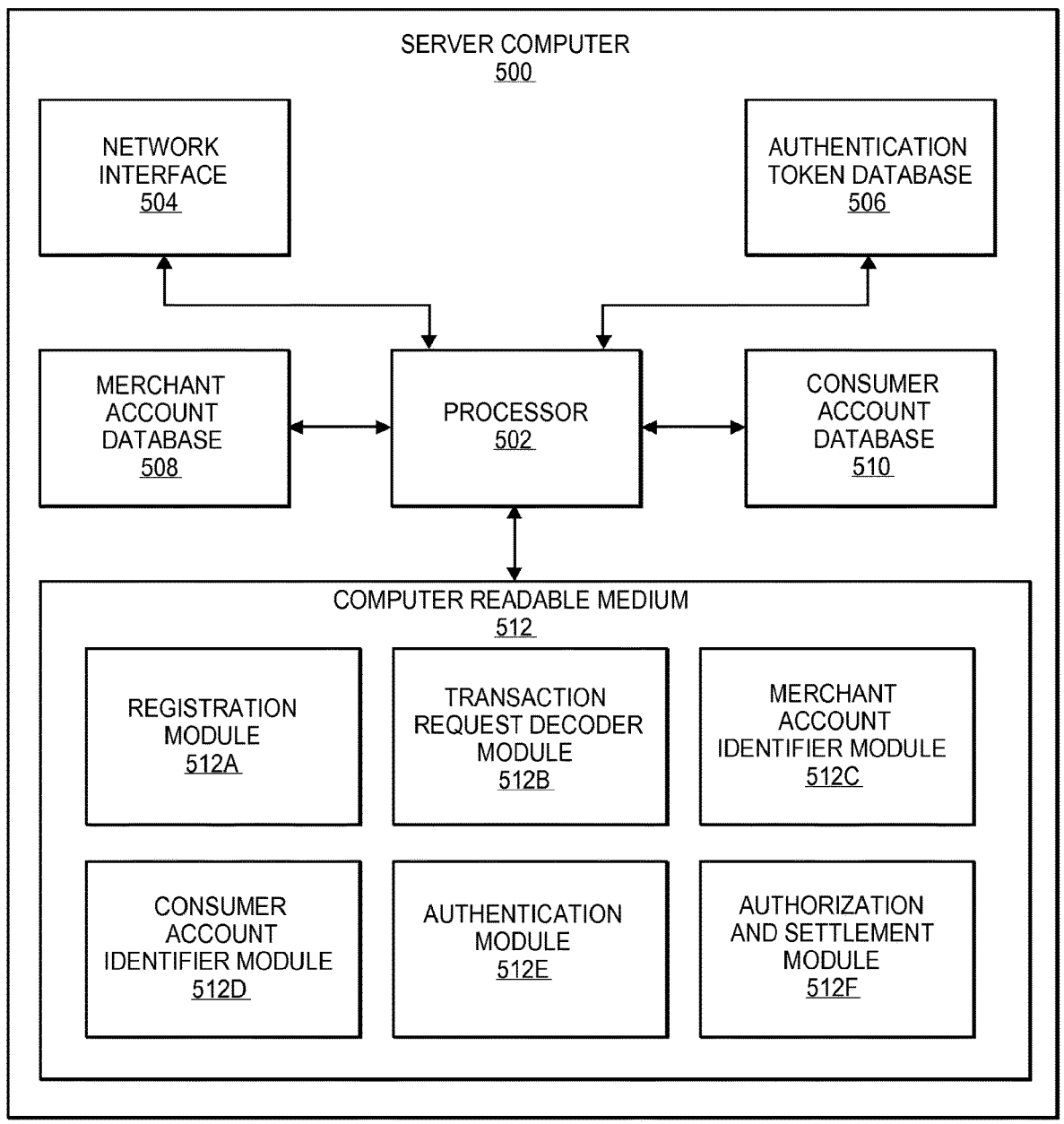
FIG. 5 illustrates some components of a server computer in one embodiment of the invention.

FIG. 5 illustrates some components of a server computer 500 in one embodiment of the invention. The server computer 500 may be associated with the payment processing network computer 112, the acquirer computer 110, the issuer computer 114 or any other suitable entity.

The server computer 500 may include a processor 502 coupled to a network interface 504, an authentication token database 506, a merchant account database 508, a consumer account database 510 and a computer readable medium 512. The computer readable medium 512 may comprise code executable by the processor 502 for implementing methods using embodiments of the invention. The computer readable medium 512 may be in the form of a memory that stores data and could be internal to server computer 500 or hosted remotely. The computer readable medium 512 may include a registration module 512A, a transaction request decoder module 512B, a merchant account identifier module 512C, a consumer account identifier module 512D, an authentication module 512E and an authorization and settlement module 512F.

The network interface 504 may be configured to enable the server computer 500 communicate with other entities (e.g., acquirer computer 110, issuer computer 114, mobile communication device 104) using one or more communications networks.

The authentication token database 506 may be configured to store authentication tokens for consumers. For example, for consumer 102, the authentication token database 506 may store one or more of voice, fingerprint, iris, facial expression, hand geometry, etc. sample, a passcode, a password, a personal identification number (PIN), etc. In some embodiments, the authentication tokens may be stored in the authentication token database 506 at the time of the user registration. In some embodiments, the authentication tokens in the authentication token database 506 may be linked to the respective device identifiers and/or consumer account identifiers.

The merchant account database 508 may be configured to store information associated with a plurality of merchant accounts such as merchant account numbers, expiration dates, account types (e.g., deposit only, regular checking or savings account, etc.), merchant identifiers, merchant names, merchant addresses, etc. Each merchant account in the merchant account database 508 may be associated with a respective merchant account identifier.

The consumer account database 510 may be configured to store information associated with a plurality of consumer accounts such as consumer account numbers, expiration dates, consumer names, consumer phone numbers, consumer addresses, etc. Each consumer account in the consumer account database 510 may be associated with a respective device identifier.

In some embodiments, the authentication token database 506 and the consumer account database 510 may be linked and may be accessed using a device identifier to retrieve a consumer account and stored authentication tokens based on the device identifier.

The registration module 512A may include code that can cause the processor 502 in the server computer 500 to register one or more consumers. In some embodiments, the registration module 512A may allow the consumer 102 to register one or more authentication tokens that may be used to authenticate a transaction conducted by the consumer 102. For example, as discussed with reference to FIG. 7A, the consumer 102 may be directed to the webpage 702 to register the authentication token. The registered authentication tokens may be stored in the authentication token database 506.

The transaction request decoder module 512B and an associated processor may be configured to receive the transaction request message transmitted by the mobile communication device 104 and to decode the transaction request message. The transaction request message may include a merchant token, a device identifier of the mobile communication device 104 and an authentication token. The merchant token may include a merchant account identifier and transaction data (e.g., a transaction amount and other transaction related information). For example, as discussed with reference to FIG. 7B, a transaction request message may be generated by the mobile communication device when the consumer 102 provides an authentication token and submits a transaction initiation request using the merchant token.

The merchant account identifier module 512C may be configured to identify a merchant account based on the merchant account identifier provided in the transaction request message. For example, the merchant account identifier module 512B may retrieve information associated with the merchant account from the merchant account database 508. In some embodiments, the merchant account may be a credit only merchant account from which money cannot be withdrawn.

The consumer account identifier module 512D may comprise code executable by the processor 502 in the server computer 500 so that the server computer 500 can identify a consumer account and an issuer based on the device identifier obtained from the transaction request message. For example, the consumer account identifier module 512D may determine information associated with the consumer account based on the device identifier obtained from the transaction request message.

The authentication module 512E may comprise code, executable by the processor 502, to cause the server computer 500 to authenticate the consumer 102 by comparing the authentication token provided by the consumer 102 with the authentication token stored in the authentication token database 506. In some embodiments, the authentication module 512E may retrieve one or more authentications tokens from the authentication token database 506 based on the device identifier obtained from the transaction request message to verify that the authentication token provided by the consumer 102 is associated with the device identifier. For example, in some embodiments, authentication of the consumer 102 can be based on both a match score indicating how closely the captured voice samples match to previously stored voice samples of the consumer 102 (called "a model of the user's voice") in the authentication token database 506, and/or a pass or fail response indicating whether the voice sample is an accurate reproduction of the word string.

The consumer's voice sample can be authenticated in any suitable manner. In one embodiment, the systems and methods can use voice biometric techniques, specifically a variation of a conventional prompted text independent speaker verification system. Certain embodiments can allow the use of a captured voice sample attempting to reproduce a word string having a random element to authenticate the consumer 102.

The authorization and settlement module 512F may comprise code, executable by the processor 502, to facilitate authorization and settlement processes. It can cause the server computer 500 to transfer money from the consumer account identified using the device identifier to the merchant account identified using the merchant account identifier for the amount equal to the transaction amount included in the merchant token. In some embodiments, a confirmation message that the payment has been processed may be sent to the mobile communication device 104. Accordingly, a transaction may be processed without the consumer's account information being transferred to the merchant or otherwise sent over a communications network. The authorization and settlement module 512F may also include code that can cause the processor 502 in the server computer 500 to generate an authorization request message to get authorization from the issuer associated with the consumer account. The authorization request message may be transmitted to the issuer computer 114 using a suitable communication medium. The authorization and settlement module 512F may also comprise code that can cause the processor 502 to receive an authorization response message from the issuer computer 114 and to forward the authorization response message to the merchant computer 108 via the acquirer computer 110 and also to the mobile communication device 104 indicating whether the transaction was approved or declined. At the end of the day, the transaction may be cleared and settled between the acquirer computer 110 and the issuer computer 114 by the authorization and settlement module 512F.

As noted above, in embodiments of the invention, push payment transactions may provide better security for consumers because the consumer's account information is not passed to a wide number of entities (some of which may have malicious or fraudulent intent) and the consumer's account information is only passed within a secure payment channel. Additionally, consumers are provided with additional transaction processing options including the use of a mobile communication device. Furthermore, the push payments are more secure and convenient for merchants because the merchants do not have to store sensitive consumer account information.

It is noted that other embodiments are also possible. For example, embodiments of the invention could be operated by an issuer, acquirer, or any other entity within a transaction processing system.

Furthermore, although the example above focuses on a retail purchase transaction, embodiments of the invention may be implemented for e-commerce transactions as well. In such transactions, the user's computer may be used as the access device and a merchant could include a bar code or QR™ code on a website so that a user does not have to key in their account number, password, etc. The e-commerce embodiment further provides convenience for a consumer (i.e., user) as they do not have to input their financial information into a website checkout procedure.

Figure 8:
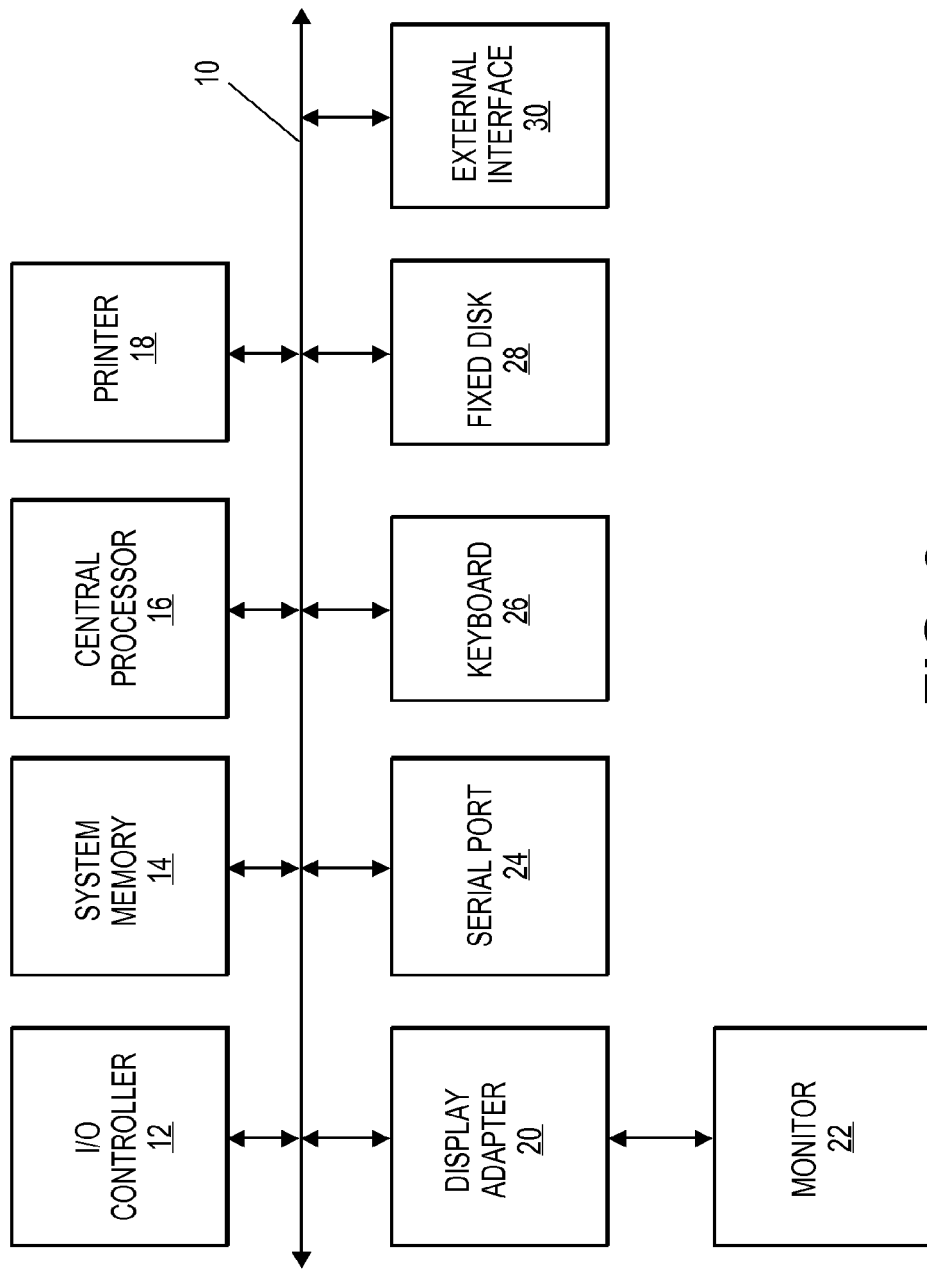
FIG. 8 illustrates a computer apparatus in one embodiment of the invention.

The various participants and elements in FIG. 1 may operate one or more computer apparatuses (e.g., a server computer) to facilitate the functions described herein. Any of the elements in FIG. 1 may use any suitable number of subsystems to facilitate the functions described herein. Examples of such subsystems or components are shown in FIG. 8. The subsystems shown in FIG. 8 are interconnected via a system bus 10. Additional subsystems such as a printer 30, keyboard 18, fixed disk 20 (or other memory comprising computer readable media), monitor 12, which is coupled to display adapter 14, and others are shown. Peripherals and input/output (I/O) devices, which couple to I/O controller 24 (which can be a processor or other suitable controller), can be connected to the computer system by any number of means known in the art, such as serial port 16. For example, serial port 16 or external interface 22 can be used to connect the computer apparatus to a wide area network such as the Internet, a mouse input device, or a scanner. The interconnection via system bus allows the central processor 28 to communicate with each subsystem and to control the execution of instructions from system memory 26 or the fixed disk 20, as well as the exchange of information between subsystems. The system memory 26 and/or the fixed disk 20 may embody a computer readable medium.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a server computer and from a mobile communication device, a transaction request message comprising a merchant account identifier, transaction data comprising a transaction amount, and a mobile communication device identifier associated with the mobile communication device, the merchant account identifier being dynamic and changing with each transaction, and the merchant account identifier being mapped to a real merchant account identifier maintained by an acquirer associated with an acquirer computer on behalf of a merchant;

receiving, by the server computer and from the mobile communication device, an authentication token;

authenticating, by the server computer, the mobile communication device based at least in part on comparing the authentication token to a stored authentication token, the stored authentication token maintained in an authentication token database in communication with the server computer, the stored authentication token determined based on the mobile communication device identifier;

identifying, by the server computer, a consumer account identifier based at least in part on the mobile communication device identifier and authenticating the mobile communication device;

sending, by the server computer, an authorization request message comprising the consumer account identifier to an issuer computer operated by an issuer that issued the consumer account identifier;

receiving, by the server computer, an authorization response message from the issuer computer comprising the consumer account identifier;

generating, by the server computer, a modified authorization response message by replacing the consumer account identifier with the merchant account identifier;

after generating the modified authorization response message by the server computer:

initiating an original credit transaction (OCT) message to credit an account associated with the merchant account identifier; and routing, by the server computer, the modified authorization response message to the mobile communication device.

2. The method of claim 1 further comprising:

generating, by the server computer, the authorization request message comprising the transaction amount and the consumer account identifier.

3. The method of claim 1, wherein the transaction request message further comprises the authentication token.

4. The method of claim 1, wherein the transaction request message is received from the mobile communication device after the mobile communication device interacts with a merchant associated with a merchant device identifier.

5. The method of claim 1, wherein initiating an OCT message comprises generating the OCT message and transmitting the OCT message to an acquirer computer associated with the merchant associated with the merchant account identifier.

6. The method of claim 1, wherein the authorization request message further comprises a CVV and an expiration date.

7. The method of claim 1, wherein the server computer is in a payment processing network that is configured to process credit and debit card transactions.

8. A server computer comprising:

a processor; and a computer readable medium, the computer readable medium comprising code, executable by the processor, for implementing a method comprising:

receiving, by the server computer and from a mobile communication device, a transaction request message comprising a merchant account identifier, transaction data comprising a transaction amount, and a mobile communication device identifier associated with the mobile communication device, the merchant account identifier being dynamic and changing with each transaction, and the merchant account identifier being mapped to a real merchant account identifier maintained by an acquirer associated with an acquirer computer on behalf of a merchant;

receiving, by the server computer and from the mobile communication device, an authentication token;

authenticating, by the server computer, the mobile communication device based at least in part on comparing the authentication token to a stored authentication token, the stored authentication token maintained in an authentication token database in communication with the server computer, the stored authentication token determined based at least in part on the mobile communication device identifier;

identifying, by the server computer, a consumer account identifier based at least in part on the mobile communication device identifier and authenticating the mobile communication device;

sending, by the server computer, an authorization request message comprising the consumer account identifier to an issuer computer operated by an issuer that issued the consumer account identifier, receiving, by the server computer, an authorization response message from the issuer computer comprising the consumer account identifier, generating, by the server computer, a modified authorization response message by replacing the consumer account identifier with the merchant account identifier;

after generating the modified authorization response message by the server computer: initiating an original credit transaction (OCT) message to credit an account associated with the merchant account identifier; and routing, by the server computer, the modified authorization response message to the mobile communication device.

9. The server computer of claim 8, wherein the method further comprises:

generating, by the server computer, the authorization request message comprising the transaction amount and the consumer account identifier.

10. The server computer of claim 8, wherein the transaction request message further comprises the authentication token.

11. The server computer of claim 8, wherein the transaction request message is received from the mobile communication device after the mobile communication device interacts with a merchant associated with a merchant device identifier.

12. The server computer of claim 8, wherein initiating an OCT message comprises generating the OCT message and transmitting the OCT message to an acquirer computer associated with the merchant associated with the merchant account identifier.

13. The server computer of claim 8, wherein the authorization request message further comprises a CVV and an expiration date.

14. The server computer of claim 8, wherein the server computer is in a payment processing network that is configured to process credit and debit card transactions.

* * * * *